United States Patent
Pandey et al.

(10) Patent No.: US 11,698,833 B1
(45) Date of Patent: Jul. 11, 2023

(54) PROGRAMMABLE SIGNAL AGGREGATOR

(71) Applicant: STMicroelectronics International N.V., Geneva (CH)

(72) Inventors: Amulya Pandey, Kanpur (IN); Manish Bansal, Ghaziabad (IN); Sandeep Bhattacharya, Noida (IN)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 0 days.

(21) Appl. No.: 17/567,540

(22) Filed: Jan. 3, 2022

(51) Int. Cl.
G06F 11/10 (2006.01)
G06F 11/07 (2006.01)
G06F 9/48 (2006.01)
G06F 9/30 (2018.01)
G06F 11/27 (2006.01)

(52) U.S. Cl.
CPC ...... *G06F 11/1068* (2013.01); *G06F 9/30101* (2013.01); *G06F 9/30145* (2013.01); *G06F 9/4812* (2013.01); *G06F 11/0772* (2013.01); *G06F 11/27* (2013.01)

(58) Field of Classification Search
CPC ............ G06F 11/1068; G06F 9/30101; G06F 9/30145; G06F 9/4812; G06F 11/0772; G06F 11/27
USPC ................. 714/764, 768, 773, 799
See application file for complete search history.

(56) References Cited

U.S. PATENT DOCUMENTS

| | | | |
|---|---|---|---|
| 3,946,366 A | 3/1976 | Edwards, Jr. | |
| 4,916,704 A | 4/1990 | Bruckert et al. | |
| 5,404,462 A | 4/1995 | Datwyler et al. | |
| 5,592,631 A | 1/1997 | Kelly et al. | |
| 5,890,222 A | 3/1999 | Agarwal et al. | |
| 5,904,462 A | 5/1999 | Gonzalez | |
| 6,735,664 B1 | 5/2004 | Keller | |
| 7,043,673 B1 | 5/2006 | Ichiriu et al. | |

(Continued)

FOREIGN PATENT DOCUMENTS

EP 3965110 3/2022

OTHER PUBLICATIONS

Alvarez, G., "Real-Time Fault Detection and Diagnosis Using Intelligent Monitoring and Supervision Systems," IntechOpen, Fault Detection, Diagnosis and Prognosis, 2019, 19 pages.

(Continued)

*Primary Examiner* — John J Tabone, Jr.
(74) *Attorney, Agent, or Firm* — Slater Matsil, LLP

(57) ABSTRACT

In an embodiment, an electronic circuit includes: a plurality of signal channels; a signal collection circuit configured to determine an action of the electronic circuit based on channel signals from the plurality of signal channels; and a first signal management circuit coupled between the plurality of signal channels and the signal collection circuit, the first signal management circuit including: a set of internal registers, a set of user registers, and a decoder configured to program the set of internal registers based on a content of the set of user registers, where the first signal management circuit is configured to receive the channel signals via the plurality of signal channels, generate first aggregated signals based on the received channel signals and a content of the set of internal registers, and transmitting the first aggregated signals to the signal collection circuit.

25 Claims, 12 Drawing Sheets

(56) References Cited

U.S. PATENT DOCUMENTS

| | | |
|---|---|---|
| 7,376,782 B2 | 5/2008 | Balraj et al. |
| 7,620,875 B1 | 11/2009 | Nelson et al. |
| 7,631,167 B2 | 12/2009 | Capek et al. |
| 7,716,521 B1 | 5/2010 | Donahue et al. |
| 7,761,763 B2 | 7/2010 | Shin et al. |
| 7,958,433 B1 | 6/2011 | Yoon et al. |
| 7,987,407 B2 | 7/2011 | Gille et al. |
| 8,243,757 B2 | 8/2012 | Sharivker et al. |
| 8,437,183 B2 | 5/2013 | Sharon et al. |
| 8,930,780 B2 | 1/2015 | Yang et al. |
| 9,063,874 B2 | 6/2015 | Zhong et al. |
| 9,142,322 B2 | 9/2015 | Baranwal et al. |
| 9,176,740 B2 | 11/2015 | Noyes et al. |
| 9,189,329 B1 | 11/2015 | Zhu et al. |
| 9,264,021 B1 * | 2/2016 | Jarrar ............... G06F 11/1608 |
| 9,432,298 B1 | 8/2016 | Smith |
| 9,612,901 B2 | 4/2017 | Ruggiero et al. |
| 9,665,423 B2 | 5/2017 | Beattie et al. |
| 9,690,650 B2 | 6/2017 | Liu et al. |
| 9,766,681 B2 | 9/2017 | Solihin et al. |
| 9,864,654 B2 | 1/2018 | Vishne et al. |
| 10,020,033 B2 | 7/2018 | Noyes et al. |
| 10,127,983 B1 | 11/2018 | Peterson et al. |
| 11,075,847 B1 | 7/2021 | Kwan et al. |
| 11,217,323 B1 | 1/2022 | Sharma et al. |
| 2001/0039601 A1 | 11/2001 | Leung et al. |
| 2003/0079164 A1 | 4/2003 | Janik et al. |
| 2004/0167992 A1 | 8/2004 | Carnevale et al. |
| 2008/0244146 A1 | 10/2008 | Das et al. |
| 2008/0263385 A1 | 10/2008 | Dudeck et al. |
| 2009/0132876 A1 | 5/2009 | Freking et al. |
| 2009/0249154 A1 | 10/2009 | Sasaki |
| 2011/0145469 A1 | 6/2011 | Choi |
| 2011/0204932 A1 | 8/2011 | Cortadella et al. |
| 2011/0289381 A1 | 11/2011 | Daga et al. |
| 2012/0124448 A1 | 5/2012 | Emerson et al. |
| 2013/0179753 A1 | 7/2013 | Flynn et al. |
| 2014/0040512 A1 | 2/2014 | Fernald |
| 2014/0201597 A1 | 7/2014 | Hoekstra et al. |
| 2014/0245105 A1 | 8/2014 | Chung et al. |
| 2015/0331740 A1 * | 11/2015 | Gupta ............... G06F 11/0724 |
| | | 714/57 |
| 2016/0034409 A1 | 2/2016 | Kim et al. |
| 2016/0103732 A1 * | 4/2016 | Tuers ............... G11C 29/52 |
| | | 714/764 |
| 2017/0024270 A1 * | 1/2017 | Loeliger ............... G06F 13/32 |
| 2017/0185539 A1 | 6/2017 | Xu et al. |
| 2017/0329610 A1 | 11/2017 | Bloomfield et al. |
| 2018/0189132 A1 | 7/2018 | Malladi et al. |
| 2018/0203759 A1 | 7/2018 | Shaeffer et al. |
| 2019/0250210 A1 * | 8/2019 | Sun ............... G01R 31/31724 |
| 2019/0332469 A1 | 10/2019 | Radjai et al. |
| 2019/0347159 A1 | 11/2019 | Chang et al. |
| 2020/0349001 A1 | 11/2020 | Hartlieb et al. |
| 2022/0180959 A1 * | 6/2022 | Borgonovo ........ G11C 29/4401 |
| 2022/0318109 A1 * | 10/2022 | Colombo ............ G06F 11/2733 |
| 2023/0042309 A1 * | 2/2023 | Zenasni ............... C23F 11/141 |

OTHER PUBLICATIONS

Texas Instruments, Ghone, C. et al., "ECC/EDC on TDAxx", Application Report, SPRAC42B—Jul. 2016—Revised Jun. 2018, 29 pages.

Jailani, N. et al., "FMS: A Computer Network Fault Management System Based on the OSI Standards," Malaysian Journal of Computer Science, vol. 11, No. 1, Jun. 1998, 11 pages.

Kapadia, R. et al., "Real World Model-based Fault Management," Conference: Proceedings of the 18th International Workshop on the Principles of Diagnosis, Jun. 2007, 8 pages.

National Instruments, "What is the ISO 26262 Functional Safety Standard?", http://www.ni.com/white-paper/13647/en/, Apr. 3, 2014, 5 pages.

St Life.Augmented, "SPC58 C Line—32 Bit Power Architecture Automotive MCU Dual z4 Cores 180 MHz, 4 MBytes Flash, HSM, ASIL-B," RM0407, Reference manual, RM0407 Rev 7, Apr. 2021, 2856 pages.

St Life.Augmented, "SPC584Cx/SPC58ECx FCCU Fault Sources and Reaction," AN5013, Application note, DocID030348 Rev 1, Apr. 2017, 49 pages.

Yoon, Doe Hyun et al., "Memory Mapped ECC: Low-Cost Error Protection for Last Level Caches", ISCA'09, Jun. 20-24, 2009, Austin, TX, 12 pages.

* cited by examiner

PROGRAMMABLE SIGNAL AGGREGATOR

TECHNICAL FIELD

The present disclosure relates generally to an electronic system and method, and, in particular embodiments, to a programmable fault management circuit.

BACKGROUND

The complexity of integrated circuits (ICs) has increased steadily in recent years. Some ICs include a plurality of circuits. For example, a system-on-a-chip (SoC) may integrate all components of a computer or another electronic system on a chip to, e.g., perform a number of functions, such as receiving and sending data, receiving and making phone calls, playing virtual games, etc. For example, a microcontroller IC may include, in addition to a central processing unit (CPU) and associated registers, a plurality of memories for, e.g., software storage, analog-to-digital converters (ADCs), digital-to-analog converters (DACs), communication interface modules, such as SPI and PC, internal oscillators, as well as other digital and analog circuits. Other examples of complex ICs include field programmable gate arrays (FPGAs), power management ICs (PMICs), processors (such as ARM or x86 processors), digital signal processors (DSPs), etc.

Some applications are considered safety critical and demand self-test and/or real time monitoring of its circuits during mission mode (during normal operation), or during start/stop of the application in the field. An example is an automotive grade application controlling safety mechanism such as braking, parking, lane change, etc.

A complex IC for safety critical applications, such as an SoC or microcontroller for automotive applications that is compliant with ISO 26262, such as compliant with automotive safety integrity level (ASIL) D, may need to test one or more circuits (e.g., integrated memories) for faults each time the car starts, as well as when the car is on (e.g., while driving). Such monitoring may be performed by a plurality of safety monitors of the complex IC.

Faults generated by the safety monitors may be routed to a fault collection and control unit (FCCU), which in turn, manages the actions taken in response to the detected faults.

SUMMARY

In accordance with an embodiment, an electronic circuit includes: a plurality of signal channels; a signal collection circuit configured to determine an action of the electronic circuit based on channel signals from the plurality of signal channels; and a first signal management circuit coupled between the plurality of signal channels and the signal collection circuit, the first signal management circuit including: a set of internal registers, a set of user registers, and a decoder configured to program the set of internal registers based on a content of the set of user registers, where the first signal management circuit is configured to receive the channel signals via the plurality of signal channels, generate first aggregated signals based on the received channel signals and a content of the set of internal registers, and transmitting the first aggregated signals to the signal collection circuit.

In accordance with an embodiment, an integrated circuit includes: a first plurality of safety monitors coupled to respective fault channels of a first plurality of fault channels, where each safety monitor of the first plurality of safety monitors is configured to generate faults in the respective fault channels of the first plurality of fault channels; a fault collection and control unit (FCCU) configured to determine an action of the integrated circuit based on the faults generated by the first plurality of safety monitors; a first fault management circuit coupled between the first plurality of safety monitors and the FCCU, the first fault management circuit including: a set of internal registers, a set of user registers, and a decoder; and a processor configured to program the set of user registers, where the decoder is configured to program the set of internal registers in response to the processor programming the set of user registers, where the first fault management circuit is configured to receive faults from the first plurality of fault channels, generate first aggregated faults based on the received faults and on a content of the set of internal registers, and transmit the first aggregated faults to the FCCU.

In accordance with an embodiment, a method includes: writing to a write data register of a set of user registers of a fault management circuit that is coupled between a plurality of safety monitors and a fault collection and control unit (FCCU), the write data register including a data write field; after writing to the write data register, writing to a command register of the set of user registers, the command register including a command field and an index field; in response to the writing of the command register, writing a plurality of internal registers of a set of internal registers of the fault management circuit based on the command, index and data write fields; receiving faults generated by the plurality of safety monitors with the fault management circuit; generating aggregated faults based on the received faults and on the set of internal registers; transmitting the aggregated faults to the FCCU; and generating interrupt requests or reset requests using the FCCU based on the aggregated faults.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
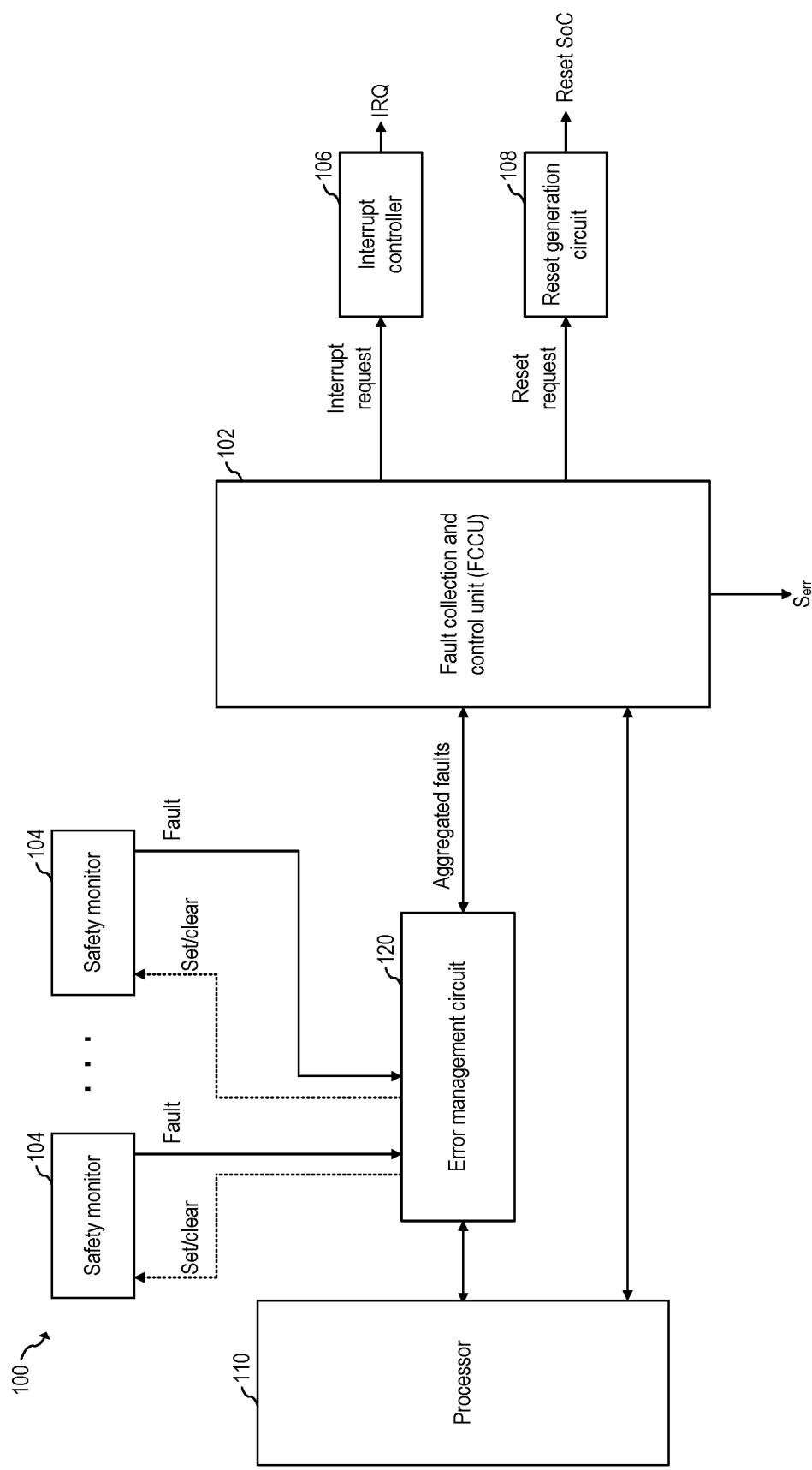
FIG. 1 shows a schematic diagram of a portion of an SoC including a fault collection and control unit (FCCU) and an error management circuit, according to an embodiment of the present invention.

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a generic layered programmable fault management micro-architecture for fault collection and control, e.g., in an SoC, e.g., for automotive applications. Some embodiments may also be used for managing other types of signals of an SoC, such as interrupts, direct memory access (DMA) channels, wakeup lines, etc. Some embodiments may be used in applications different form automotive, such as consumer (e.g., mobile) and industrial applications.

In an embodiment of the present invention, an FCCU with a layered architecture provides full control of faults via indirect register access. In some embodiments, faults generated by safety monitors of an SoC are aggregated by a plurality of error management circuits. The aggregated (and, e.g., post-processed) faults are transmitted to the FCCU for further processing (e.g., for the FCCU to take action, such as interrupt or reset the SoC, based on the faults). In some embodiments, the error management circuits operate as programmable fault signal aggregators that, in addition to aggregate faults, are capable of injecting fake faults into the safety monitors, mask one or more faults, and/or provide one or more features, such as security features (e.g. perform error detection checks), based on a set of internal registers embedded in each error management circuit. The set of internal registers of the error management circuits are accessed indirectly via user registers. In some embodiments, accessing internal registers of the error management circuits indirectly advantageously allows for managing faults in a compact and optimized manner while allowing for circuit design portability, as well as portability of the associated documentation, verification and configuration code.

FIG. 1 shows a schematic diagram of a portion of SoC 100, according to an embodiment of the present invention. SoC 100 includes FCCU 102, a plurality of safety monitors 104, processor 110, interrupt controller 106, reset generation circuit 108, and one or more error management circuits 120.

During normal operation, the plurality of safety monitors 104 monitor the state of various circuits of SoC 100. When a safety monitor 104 detects a malfunction, the safety monitor 104 may generate a fault, which is routed to an associated error management circuit 120. The error management circuit 120 may, based on the detected fault and on the configuration of the error management circuit 120, aggregate received faults and route such aggregated faults to FCCU 102. FCCU 102 then determines, based on the detected fault and on the configuration of FCCU 102, which action to take in response to the detected fault. For example, in some embodiments, FCCU 102 may generate an interrupt request (e.g., to halt an operation of SoC 100 or to perform an action, such as additional tests), request a reset of SoC 100, or take no action, in response to a particular fault. In some embodiments, an error signal $S_{err}$ may be generated and provided in a terminal (e.g., pin or pad) of SoC 100 for an external circuit (e.g., a central processing unit of a car).

In some embodiments, processor 110 may configure error management circuit 120 by causing one or more internal registers of error management circuit 120 to be programmed, e.g., via a communication interface (such as APB, SPI, I²C, etc.). For example, in some embodiments, error management circuit 120 may be programmed to mask (ignore) faults from a particular (or group of) safety monitor(s) 104, to enable or disable a particular (or group of) safety monitor(s) 104, to inject faults to a particular (or group of) safety monitor(s) 104, and/or clearing the fault, in response to a particular fault.

In some embodiments, processor 110 may configure FCCU 102 by causing one or more internal registers of FCCU 102 to be programmed, e.g., via a communication interface (such as APB, SPI, I²C, etc.). For example, in some embodiments, FCCU 102 may be programmed to mask (ignore) faults from a particular (or group of) safety monitor(s) 104, to enable or disable a particular (or group of) safety monitor(s) 104, select which action to take (e.g., generate an interrupt request, reset request, and/or assert an error signal $S_{err}$), and/or clearing the fault, in response to a particular fault.

In some embodiments, processor 110 may configure FCCU 102 and/or one or more error management circuits 120 after power-up of SoC 100. In some embodiments, processor 110 may configure or reconfigure FCCU 102 and/or one or more error management circuits 120 at one or more times after power-up of SoC 100, such as after a reset of SoC 100, or in response to a particular detected fault or state of SoC 100, for example.

In some embodiments, an error management circuit 120 may be programmed (e.g., by processor 110 or an automated test equipment (ATE)) to test the processing of a particular fault by intentionally injection such fault. For example, error management circuit 120 may cause a particular safety monitor 104 to generate (set) a fault, and then process such injected fault (e.g., internally by the error management circuit 120). For example, in some embodiments, processor 110 configures error management circuit 120 to inject a fake fault associated with a particular safety monitor 104. Error management circuit 120 then causes such particular safety monitor 104 to generate a fake fault (e.g., by writing a register of such particular safety monitor 104). The error management circuit 120 then receives such fake fault and generates a result (which may be stored, e.g., in an internal register of such particular error management circuit 120). Processor 110 may receive the result of the fake fault injection, e.g., by performing a read operation on the error management circuit 120.

As shown in FIG. 1, error management circuit 120 may aggregate faults and route the aggregate faults to FCCU 102. Thus, in some embodiments, when FCCU 102 receives a fault from error management circuit 120, FCCU 102 may be alerted of a fault generated by a particular group of safety monitors 104 (e.g., associated with error management circuit 120), but may be unable to identify which safety monitor(s) 104 generated the fault(s) (since, e.g., the faults generated by a plurality of safety monitors 104 may be aggregated (e.g., ORed) into a single fault routed to FCCU 102). In some embodiments, such lack of granularity of information may not impact the way in which the fault is handled (e.g., similar faults may be handled in a similar manner). In some embodiments, processor 110 may access 102 to identify which error management circuit 120 generated the fault, and then access such error management circuit 120 to identify which safety monitor(s) 104 generated the fault(s).

Some of the plurality of safety monitors 104 may be the same, while others may be different. For example, one or more safety monitors 104 may be temperature sensors configured to monitor the temperature of SoC 100 at various locations of SoC 100 and to generate a fault when the measured temperature is outside a predetermined range. One or more of the safety monitors 104 may be memory built-in self-test (MBIST) circuits configured to test one or more internal memories of SoC 100 and to generate a fault when the tested memory malfunctions. One or more safety monitors 104 may report faults when a CRC or parity check fails during data transmission and/or in a memory. One or more of the safety monitors 104 may monitor analog circuits (e.g., such as a PLL, oscillator, etc.) and issue a fault when such analog circuit malfunctions (e.g., PLL loss of lock, system frequency out of range, etc.). One or more of the safety monitors 104 may BIST circuits for testing digital circuits of SoC 100 and which may generate a fault when a digital circuit malfunctions. Other safety monitor 104 may also be implemented in SoC 100. Safety monitors 104 may be implemented in any way known in the art.

In some embodiments, the plurality of safety monitors 104 are scattered across SoC 100. For example, various safety monitors 104 implemented as temperature sensors may be located at different portions of the layout of SoC 100 to monitor temperature such locations. As another example, a safety monitor 104 implemented as an MBIST circuit may be located near the memory that such MBIST circuit is configured to test.

Interrupt controller 106 is configured to schedule interrupt requests to one or more processors (e.g., 110) of SoC 100. Interrupt controller 106 may be implemented in any way known in the art.

Reset generation circuit 108 is configured to manage the reset sequence of SoC 100, e.g., in response to a reset request. Reset generation circuit 108 may be implemented in anyway known in the art.

Processor 110 may be implemented as a generic or custom processor or controller. For example, in some embodiments, processor no may be implemented as a processor coupled to a memory and configured to execute instructions stored in such memory. Other implementations are also possible.

In some embodiments, SoC 100 is integrated in a single monolithic integrated circuit (IC). In some embodiments, SoC 100 may be implemented in a partially integrated or non-integrated manner, with one or more discrete circuits. For example, in some embodiments, one or more safety monitors 104 may be external to the IC that contains FCCU 102 and processor 110. Other implementations are also possible.

In some embodiments, SoC 100 may be a microprocessor. SoC 100 may be implemented as other circuits, such as a power management IC (PMIC), digital signal processor (DSP), or an application specific IC (ASIC), for example.

Although FIG. 1 shows a single error management circuit 120, some embodiments may implement a plurality of error management circuits 120. For example, in some embodiments, safety monitors 104 may be spatially grouped so that they route their faults to associated (and physically close) error management circuit 120. By spatially grouping safety monitors, and associating each group of safety monitors to a respective and physically close error management circuit, some embodiments advantageously reduce routing congestion and/or route length in the SoC.

FCCU 102 is configured to receive faults and manage the actions taken in response to such received faults. In some embodiments, FCCU 102 may be implemented in any way known in the art.

In some embodiments, FCCU 102 has a fixed number of fault input terminals for receiving faults. In some embodiments, the fault aggregation performed by the one or more error management circuits 120 of SoC 100 is designed such that all of the fault input terminals of FCCU 102 are used. For example, in an embodiment implementing FCCU 102 with 256 fault input terminals and having a single error management circuit 120 receiving 1000 faults signals from associated safety monitors 104 may perform an aggregation (a reduction operation) such that 256 aggregated fault signals are generated (from the 1000 fault signals received) by the single error management circuit 120. More generally, in embodiments in which FCCU 102 has Q fault input terminals and L safety monitors 104 (L being greater than Q), the aggregation operation performed by each of the error management circuit 120 may be designed such that FCCU 102 receives Q fault signals.

As will be explained in more detail below, error management circuits 120 may directly or indirectly (e.g., via other error management circuit(s) 120) transmit aggregated faults to FCCU 102. When transmitting aggregated faults indirectly to FCCU 102, aggregated faults generated by one error management circuit 120 may be further aggregated by subsequent error management circuit(s) 120.

Figure 2:
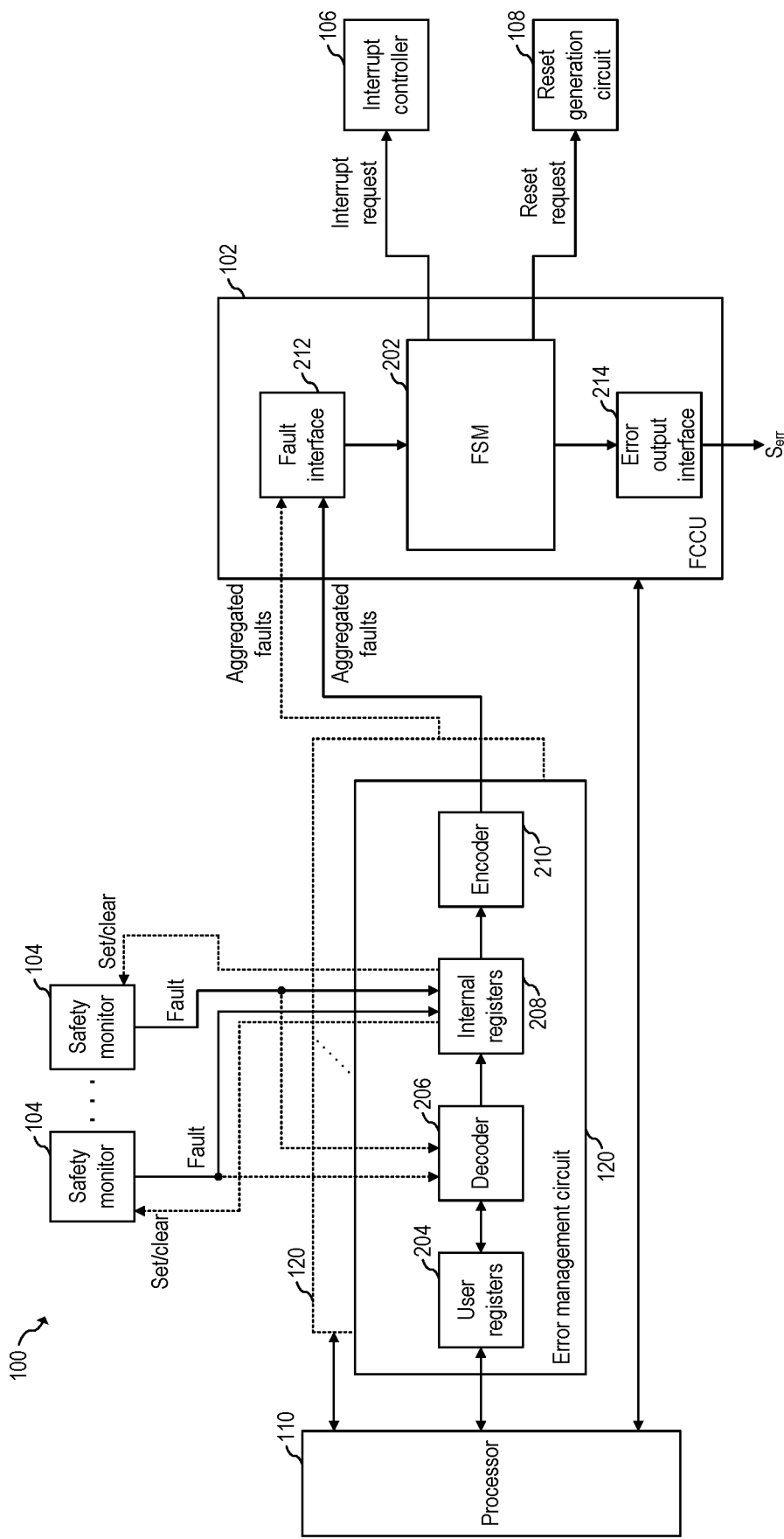
FIG. 2 shows a schematic diagram illustrating a possible implementation of the error management circuit of FIG. 1, according to an embodiment of the present invention.

FIG. 2 shows a schematic diagram of SoC 100 illustrating a possible implementation of error management circuit 120 and a possible implementation of FCCU 102, according to an embodiment of the present invention. As shown in FIG. 2, in some embodiments, error management circuit 120 may includes a plurality of user registers 204, a plurality of internal registers 208, decoder circuit 206, and encoder circuit 210. As shown in FIG. 2, in some embodiments, FCCU 102 includes finite state machine (FSM) 202 fault interface 212, and error output interface 214.

During normal operation, faults generated by the plurality of safety monitors 104 are received by error management circuit 120. For example, in some embodiments, faults generated by safety monitors 104 cause respective bits of internal registers 208 to be asserted (e.g., to transition from 0 to 1).

Encoder 210 aggregates fault signals received by the safety monitors 104 and routes such aggregated fault signals to fault interface 212. For example, in some embodiments, an OR gate is used to aggregate a plurality of faults, where the output of the OR gate is 1 if any of the bits associated with the plurality of faults is 1.

Fault interface 212 signals a fault condition to FSM 202 when a fault is received. When FSM 202 receives an indication that a safety monitor 104 generated a fault, the actions that FSM 202 may take includes:

no action (stay in a normal state), if the fault received is masked; or move from the normal state into a fault state, if the fault received is unmasked.

In some embodiments, FSM 202 may generate an interrupt request, a reset request, and/or cause error output interface 214 to assert error signal $S_{err}$, when FSM 202 is in the fault state based on the fault received and the state of internal registers 208. Upon clearing of the fault (e.g., after reset, or after safety monitor 104 clears the fault because it is no longer present), FSM 202 may return to the normal state.

In some embodiments, fault interface 212 may receive (e.g., aggregated) faults from one or more error management circuits and/or from safety monitors 104 that are connected directly to fault interface 212. In some embodiments, fault interface 212 may be implemented in any way known in the art. For example, in some embodiments, fault interface 212 may have N terminals for receiving N fault signals from various sources, such as one or more safety monitors 104 and/or one or more error management circuits 120. In some embodiments, N may a positive integer, such as 20, 100, 256, 512, or more.

In some embodiments, error output interface 214 may route signal $S_{err}$ to a pin or pad of SoC 100 (based on the configuration of FCCU 102) so that signal $S_{err}$ is accessible by an external device. In some embodiments, error output interface 214 may be implemented in any way known in the art.

In some embodiments, FSM 202 determines which action to take during the fault state (based on the configuration of FCCU 102). In some embodiments, FSM 202 may be implemented in any way known in the art.

In some embodiments, internal registers 208 may include bits for programming error management circuit 120 (e.g., for configuring how to aggregate fault signals, for masking fault signals, etc.), status bits (such as bits indicative of the status of each of the fault signals from safety monitors 104, for example), and bits for configuring the safety monitors 104 (e.g., for injecting fake faults, enabling or disabling the safety monitors 104, etc.). For example, an enable bit may be associated to each of the safety monitors 104; safety monitors 104 having their associated enable bit asserted (e.g., 1) may be aggregated by encoder 210 and routed to FCCU 102 while faults generated by safety monitors 104 having their associated bit deasserted (e.g., 0) may be not routed by encoder 210 to FCCU 102.

Internal registers 208 may be programed indirectly via user registers 204. For example, in some embodiments, internal registers 208 are not directly accessible by processor 110 and only user registers 204 are accessible by processor 110. In some embodiments, to program internal registers 208, processor 110 programs user registers 204. Decoder 206 decodes the data of user registers 204 and programs one or more internal registers 208 based on the content of user register 204.

In some embodiments, user registers 204 may be used to read data from internal registers 208. For example, in some embodiments, upon a read request in user registers 204, decoder 206 retrieves data form internal registers 208, and populates one or more registers of user registers 204 such that processor 110 can access such data. For example, in some embodiments, processor 110 may upon identifying that FCCU 102 received a fault from a particular error management circuit 120, issue a read command to such particular error management circuit 120 via user registers 204 to retrieve the status of one or more safety monitors 104 (e.g., to determine which safety monitor 104 has the associated fault signal asserted).

In some embodiments, there may be a high number of fault signals (e.g., hundreds or thousands of faults signals) being routed inside SoC 100. Such high number of fault lines may result in a very high number of internal registers 208 (such as dozens or hundreds, or thousands of internal registers 208). In some embodiments, the number of user registers 204 is (e.g., substantially) smaller than the number of internal registers 208. For example, in some embodiments, there may be 10 times or 100 times, less user registers (or less) than internal registers 208. For example, in some embodiments, there may be dozens or hundreds of internal registers 208 and there may be less than 10 (e.g., 3 or 4) user registers. By keeping the number of user registers 204 small, some embodiments advantageously keep the complexity of programming error management circuit 120 (and thus of configuring the fault management of SoC 100) low (since only a few user registers 204 may need to be programmed to fully configure each of the error management circuits 120).

In some embodiments, the size of each of the user registers 204 may be the same as the size of each of the internal registers 208. For example, in some embodiments, each of the user registers 204 is a 32-bit register and each of the internal registers 208 is a 32-bit registers. Other register sizes, such as 8-bit, 16-bit, 64-bit or different, may also be used.

In some embodiments, the size of each of the user registers 204 may be different than the size of each of the internal registers 208. For example, in some embodiments, each of the user registers 204 is a 32-bit register and each of the internal registers 208 is an 8-bit registers. Other register sizes, may also be used.

In some embodiments, encoder 210 is configured to aggregate fault signals from safety monitors 104 into one or more aggregated fault signals. For example, in some embodiments, encoder 210 is configured to aggregate into a single aggregated fault signal all fault signals from safety monitors 104 that are not masked (e.g., enable bit deasserted). For example, in some embodiments, encoder 210 includes an OR gate having an output for generating a single aggregated fault, and a masking circuit for gating the propagation of masked faults while allowing the unmasked faults to reach the OR gate. In some embodiments, encoder 210 is implemented with a plurality of outputs, and a hashing function is used to determine which (if any) of the plurality of outputs of encoder 210 is asserted. Other implementations are also possible.

In some embodiments, decoder 206 is configured to cause the programming of the internal registers 208 based on user registers 204. As shown in FIG. 2, in some embodiments, decoder 206 may also be configured to perform fault processing (e.g., dynamically determine which fault signals to mask based on a current state of SoC 100) of one or more (or all) faults of the associated safety monitors 104. In some embodiments, decoder 206 is configured to receive all faults from the safety monitors 104 associated with the error management circuit 120, and decoder 120 causes the programming of the internal registers 208 (instead of safety monitors 104 programming the internal registers 208 directly). Thus, in some embodiments, decoder 206 is the only circuit with direct programming access to internal registers 208, and decoder 206 and encoder 210 are the only circuits with direct read access from internal registers 208. In some embodiments, decoder 206 may be implemented with digital circuits, such as including combinatorial logic.

As shown in FIG. 2, SoC 100 may include a plurality of error management circuits 120. In some embodiments, each error management circuit 120 may operate in a similar or identical manner, and may be implemented in a similar or identical manner.

Figure 3:
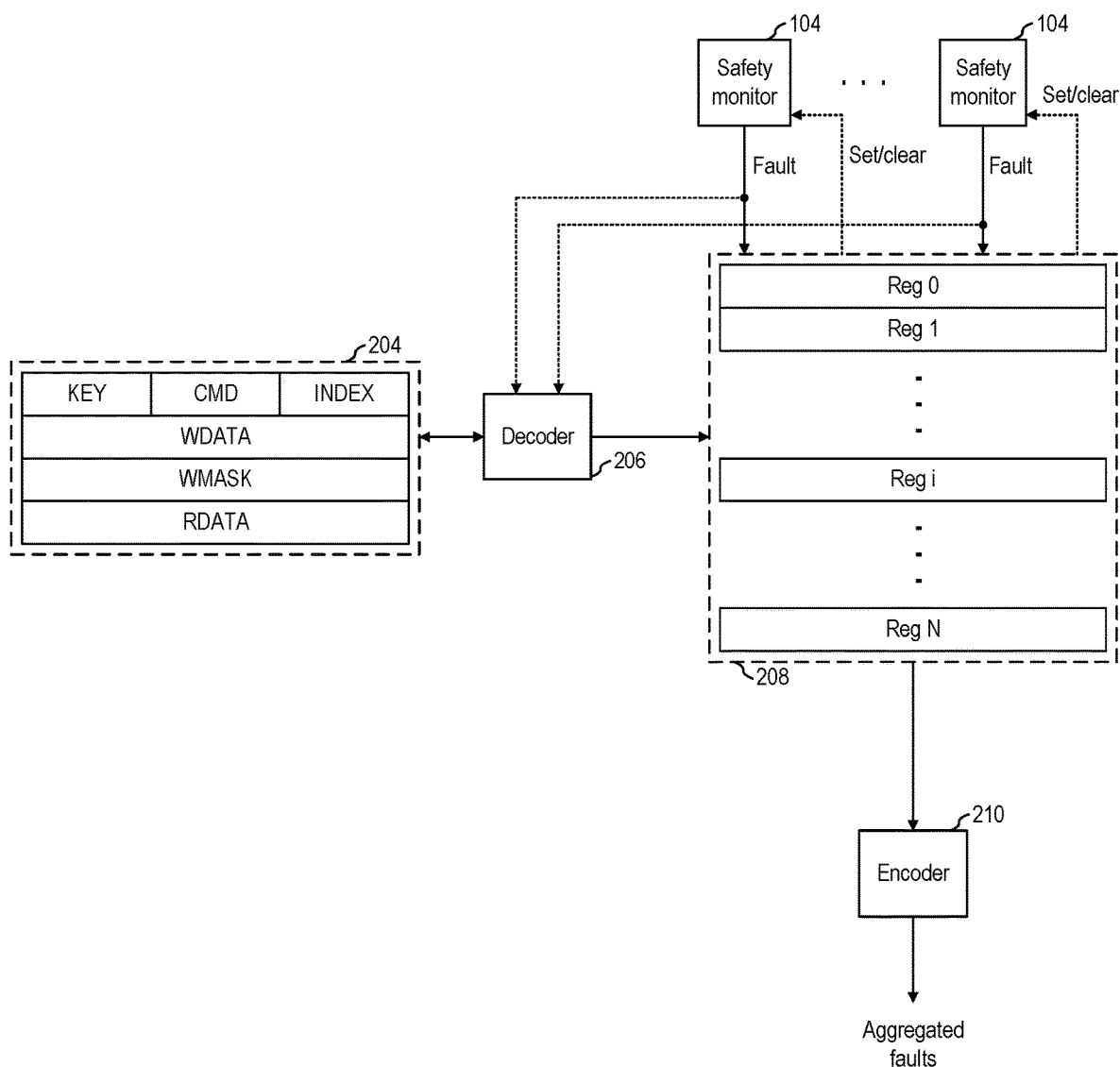
FIG. 3 shows a block diagram illustrating a possible implementation of the user registers of the error management circuit of FIG. 2, according to an embodiment of the present invention.

FIG. 3 shows a block diagram illustrating a possible implementation of user registers 204, according to an embodiment of the present invention. User registers 204 include a command register including a key field (KEY), a command field (CMD) and an index field (INDEX), a data write register having a data write field (WDATA), a mask write register having a mask field (WMASK), and a data read register having a data read field (RDATA). In some embodiments, the command register, data write register and mask write registers are write only while the data read register is read only. In some embodiments, the command register, data write register and/or mask write registers are read/write registers.

In some embodiments, the key field (KEY) is used as a security mechanism to unlock access to internal registers 208. For example, a secret predetermined key may be required for decoder 206 to process the content of user registers 204. The security mechanism may be implemented in different ways. For example, in some embodiments, the same predetermined KEY may be used to access all user registers 204. In some embodiments, the KEY may depend on which user registers 204 may be accessed. In some embodiments, a different KEY may be required each time the user registers 204 are accessed. Other approaches may also be used. In some embodiments, the security mechanism and the key field may be omitted.

In some embodiments, the command field (CMD) is indicative of the type of action and/or type of configuration to be applied to error management circuit 120. For example, command 0x01 may be for enabling (unmasking) a fault, command 0x02 may be for disabling (masking) a fault of a particular safety monitor 104, command 0x03 may be for injecting a fault to a particular safety monitor 104, command 0x05 may be for reading a status of a particular safety monitor 104 (e.g., the current state of the safety monitor, such as enabled/disabled, whether a fault has been triggered, etc.), command 0x06 may be for reading a status of a group of associated safety monitors 104, command 0x07 may be reading fault data of a particular (or a group of) safety monitors 104, command 0x11 may be for enabling a group of faults, command 0x13 may be for injecting a group of faults, etc. Other implementations are also possible.

In some embodiments, the index field (INDEX) is indicative of the particular channel(s) (e.g., fault signal, group of fault signals, error signal, or group of error signals) to which the command is to be applied. For example, in some embodiments, the index value identifies the particular fault signal or group of fault signals to which the command is to be applied. For example, the INDEX field may be interpreted to identify a particular safety monitor 104 when the CMD field applies to a particular safety monitor 104 (e.g., commands 0x01, 0x02, etc.). the INDEX field may be interpreted to identify a group of safety monitors 104 when the CMD field applies to a group of faults (e.g., 0x11, 0x13, etc.).

In some embodiments, the data write field (WDATA) includes parameters that in cooperation with the CMD field and INDEX field, configure a particular aspect(s) of error management circuit 120. For example, in an embodiment in which WDATA is a 32-bit field, safety monitors 104 may be grouped in groups of 32 safety monitors 104 so that each bit of the 23 bits of the WDATA is associated with a respective safety monitor 104 of the group. For example, in some such embodiments, issuing a command for enabling a group of faults (e.g., 0x11) with INDEX set to 1 causes decoder 206 to interpret the WDATA field bitwise, where each of the 32 bits of WDATA is associated with a respective safety monitor of the 32 safety monitors of group 1. Decoder 208 then programs internal registers 208 such that each of the safety monitors 104 associated with a 1 in the WDATA field is enabled (unmasked).

In some embodiments, the mask field (WMASK) may be used to indicate bits that are not to be overwritten by a write command (e.g., for a read-modify-write function). For example, for group commands in which bits of the WDATA field are associated with respective safety monitors of a group (e.g., as indicated by the INDEX field), the bits WMASK field may be used, when asserted (e.g., 1), to indicate which safety monitors 104 of the group indicated by the INDEX field are to be not modified by the group command.

In some embodiments, the data read field (RDATA) may be used to retrieve information of error management circuit 120 after a read command (e.g., as specified by the CMD), such as information about a particular channel (or group of channels), e.g., as identified by the INDEX field. For example, in some embodiments, processor 110 may issue a group read command (e.g., 0x06) to determine the status of a group (e.g., 32 safety monitors 104) identified by the INDEX field. After receiving the group read command, decoder 206 populates the RDATA field so that each of the 32 bits of the RDATA field indicates whether a fault is asserted (e.g., 1) or not (e.g., 0) of the respective safety monitor 104 of the 32 safety monitors 104 of the group of safety monitors 104 identified by the INDEX field. By using group read commands, in some embodiments, reading data associated with error management circuit 120 may be advantageously performed with a lower number of register reads (e.g., a single register read instead of reading multiple registers, e.g., associated with the multiple safety monitors), thereby advantageously retrieving information from error management circuit 120 faster than if reading individual internal registers 208.

In some embodiments, one or more commands CMD may cause decoder 206 to program multiple internal registers 208. For example, in some embodiments, a single command CMD may cause all safety monitors 104 of a group (e.g., as identified by the INDEX field) to be enabled (unmasked), e.g., by writing CMD to 0x11 and having all bits of WDATA asserted (e.g., 1) and all bits of the WMASK field deasserted (e.g., 0). Thus, in some embodiments, configuring error management circuit 120 may be advantageously performed with a lower number of register writes, thereby advantageously programming error management circuit 120 faster than if processor 110 programs each of the internal registers 208 individually.

Figure 4:
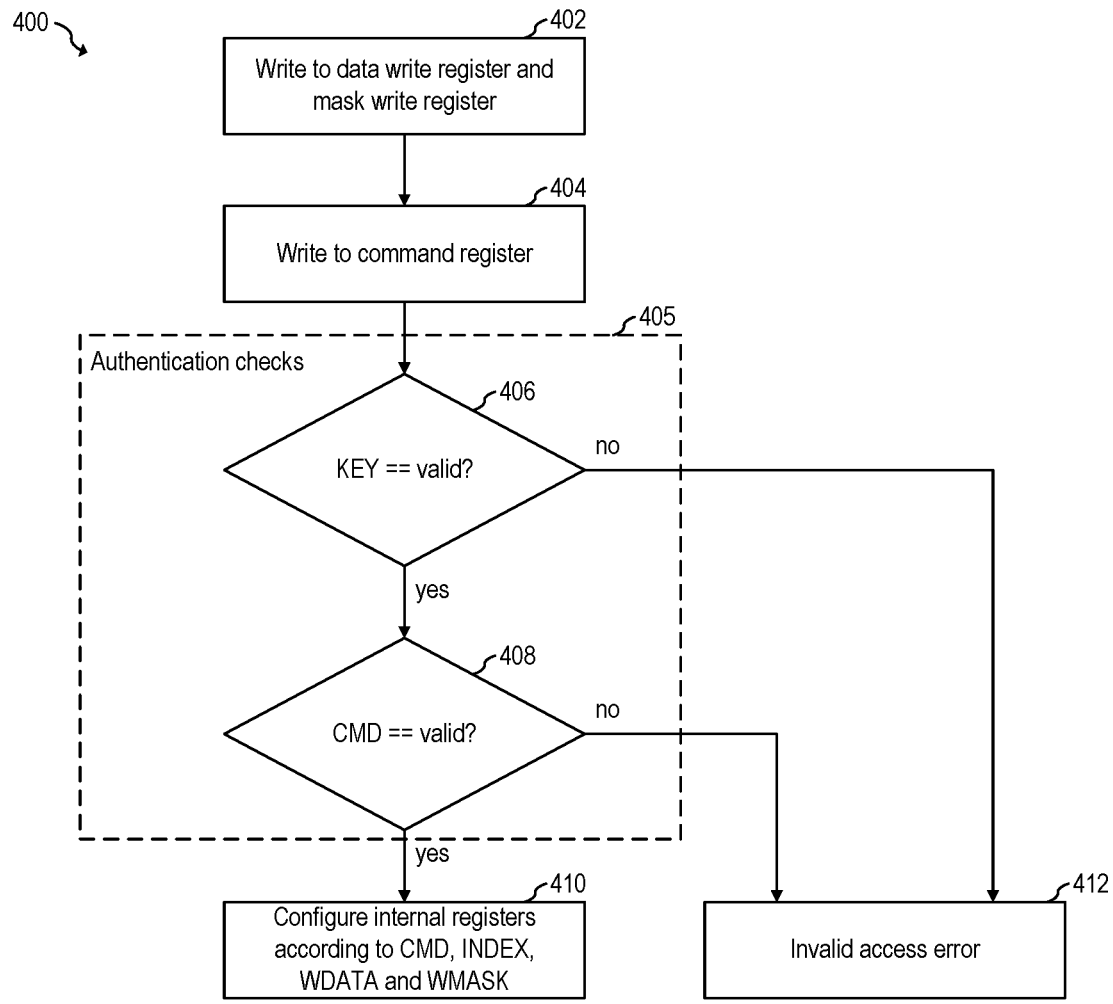
FIG. 4 shows a flow chart of an embodiment method for configuring the error management circuit of FIG. 2, according to an embodiment of the present invention.

FIG. 4 shows a flow chart of embodiment method 400 for configuring error management circuit 120, according to an embodiment of the present invention. FIG. 4 may be understood in view of FIGS. 2 and 3.

During step 402 processor 110 writes the data write register (WDATA field) and mask write register (WMASK field). During step 404 (and after step 402), processor 110 writes the command register (KEY, CMD, and INDEX fields).

During step 405, and upon the writing of the command register, decoder 206 performs authentication checks. If any of the authentication checks fail, an invalid access error (e.g., which may be provided in the RDATA field) is issued during step 412.

In some embodiments, step 405 includes steps 406 and 408. In some embodiments, other authentication checks, instead of or in addition to authentication checks performed during steps 406 and 408, may also be performed. In some embodiments, one or more authentication checks may be performed only once during the first access to user registers 204 after power-up of SoC 100. In some embodiments, one or more (or all) authentication checks may be performed each time processor 100 accesses user registers 204. Other implementations are also possible.

During step 406, decoder 206 checks whether the content of the KEY field matches the predetermined key.

During step 408, decoder 206 checks whether the content of the CMD field is valid during step 408. For example, in some embodiments, only a subset of possible values of the CMD field are assigned to valid commands. For example, in an embodiment, the command 0x20 may be unassigned (e.g., reserved).

If decoder 206 determines that the content of the KEY field is valid (during step 406) and that the content of the CMD field is valid (during step 408), decoder 206 writes (during step 410) one or more internal registers 208 in accordance with the content of the CMD, INDEX, WDATA, and WMASK fields. In some embodiments, decoder 206 may write multiple internal registers 208 for a single CMD.

If decoder 206 determines that the content of the KEY field is invalid (during step 406) or that the content of the CMD field is invalid (during step 408), decoder 206 then issues an invalid access error during step 412. For example, in some embodiments, the invalid access error may be reported in the RDATA field. In some embodiments, the invalid access error is first captured in a status bit of a status register of the internal registers 208, and then the information is made available in the RDATA field once a correct KEY is provided.

Figure 5:
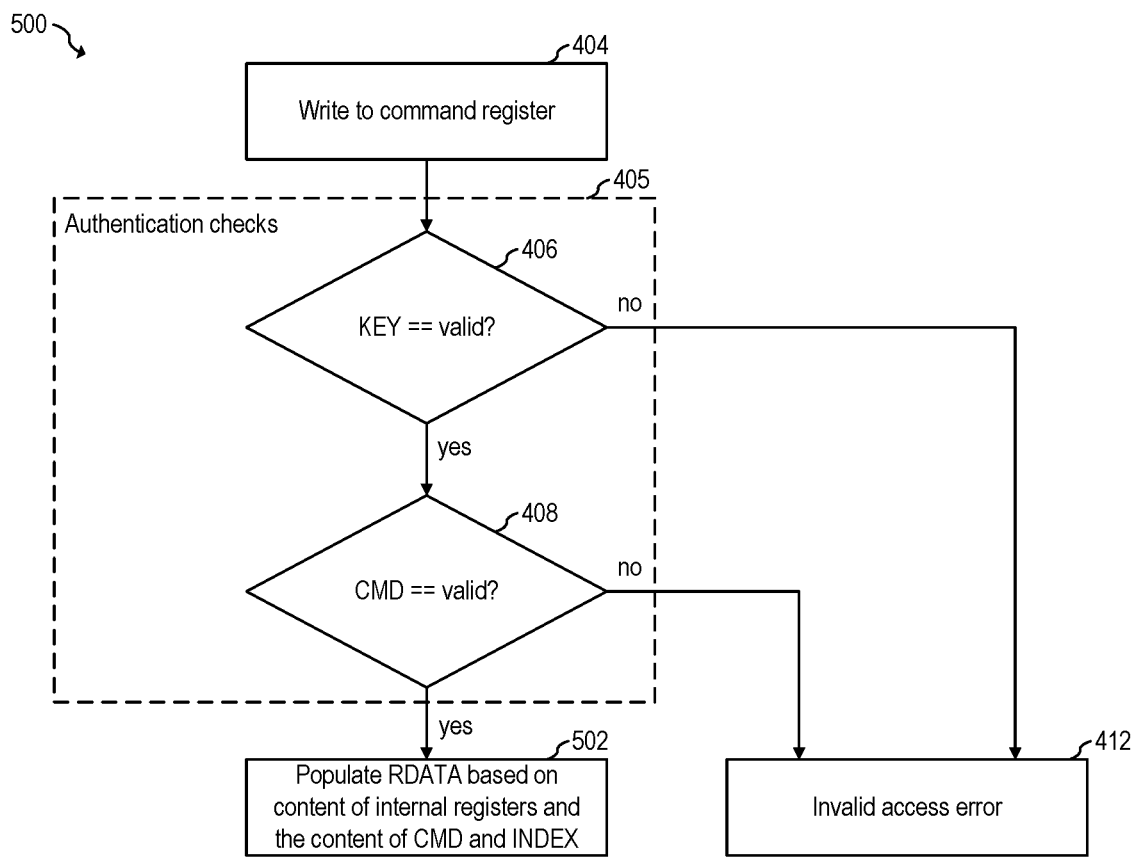
FIG. 5 shows a flow chart of an embodiment method for reading content associated with the error management circuit of FIG. 2, according to an embodiment of the present invention.

FIG. 5 shows a flow chart of embodiment method 500 for reading content associated with error management circuit 120, according to an embodiment of the present invention. FIG. 5 may be understood in view of FIGS. 2 and 3. As shown, method 500 includes steps 404, 405, 406, 408, 412, and 512. Steps 404, 405, 406, 408, and 412 may be performed in a similar manner as described with respect to method 400.

During step 502, decoder 206 collects data from internal registers 208 based on the content of the CMD and INDEX fields, and populate the RDATA field based on such content.

As illustrated in FIGS. 2-5, in some embodiments, by avoiding the programming of the internal registers 208 directly, and instead using a limited set of user registers 206 for programming error management circuit 120, the arrangement (addressing, location of bits, etc.) of the internal registers 208 may be decoupled from the user registers 206, and thus, from processor 110.

In some embodiments, the decoupling of the user registers 206 from the internal registers 208 advantageously allows for reusability of at least a portion of the verification code (for verifying the circuit design using simulations) during the circuit design process. For example, the number of internal registers 208 and their arrangement may depend on the number of fault signals received by error management circuit 120. As a non-limiting example, a circuit designer may design a first microcontroller that includes 100 safety monitors 104 coupled to error management circuit 120, which in turn is couple to FCCU 102. The circuit designer may then generate verification code to verify proper operation of error management circuit 120 and FCCU 102 by performing various register access (read/write) to the user registers 204 during circuit simulation, as well as accessing registers of FCCU 102. The circuit designer may then design a second microcontroller that includes 90 safety monitors, and that is otherwise identical to the first microcontroller (e.g., by copying the circuit design of the first microcontroller and removing 10 safety monitors). The removal of the 10 safety monitors from the microcontroller design may result in the removal/rearranging of the internal registers 208. In some embodiments, the user registers 204 may advantageously not change despite the changes in internal registers 208. For example, in some embodiments, decoder 206 may be modified to mask or avoid writing the deleted internal registers 208. Thus, the same verification code used to verify proper operation of the error management circuit 120 and FCCU 102 of the first microcontroller may be advantageously reused (e.g., in an identical manner) to verify the error management circuit of the second microcontroller. Thus, in some embodiments, rewriting verification code to access internal registers 208 when the internal registers 208 change (e.g., as a result of removal or addition of safety monitors and/or other features addition/removal) may be advantageously avoided.

In some embodiments, the use of one or more error management circuits 120 may advantageously allow for the reusing of the FCCU 102 design. For example, as channels and/or features are added or removed from one SoC design to the next, such design changes (e.g., addition or removal of fault channels and/or features) may be implemented in the one or more error management circuits 120 without modifying the circuit design of FCCU 102.

In some embodiments, the decoupling of the user registers 204 from the internal registers 208 advantageously allows for reusability of at least a portion of the configuration code (e.g., software/firmware run by processor 110 for configuring error management circuit(s) 120 and FCCU 102) after the design of error management circuit 120 changes (e.g., after feature addition/removal of error management circuit 120 and/or addition/removal of fault channels). For example, programming code run by processor 110 to configure the error management circuit 120 and the FCCU 102 of the first microcontroller (with 100 safety monitors 104) may be advantageously fully reused if the first microcontroller is replaced with the second microcontroller (with 90 safety monitors 104).

In some embodiments, the decoupling of the user registers 204 from the internal registers 208 advantageously allows for reusability of at least a portion of the documentation (e.g., datasheets, register maps) associated with the error management circuit and FCCU after the design of the error management circuit 120 changes (e.g., after feature addition/ removal of error management circuit 120 and/or additional/removal of fault channels). For example, the documentation associated with the fault management of SoC 100 may omit any details of internal registers 208 and only share details of user registers 204. In some embodiments, feature changes associated with fault management of SoC 100 (e.g., addition/removal of fault signals, and/or addition or removal of fault management features) may be addressed by modifying the design of decoder 206, encoder 210, and internal registers 208, without impacting user registers 204 and associated documentation.

In some embodiments, the decoupling of the user registers 204 from the internal registers 208 advantageously allows for reusability of the IPXACT documentation associated with the error management circuits 120 after the design of error management circuits 120 changes (e.g., after feature addition/removal of FCCU 102 and/or additional/removal of fault channels). For example, IPXACT may be understood as an XML format that defines and described reusable circuit designs. In some embodiments, IPXACT documentation may be generated for user registers 204 and not for the internal registers 208 (e.g., since the internal registers 208 are not accessible by processor 110). Thus, some embodiments may advantageously avoid regenerating IPXACT documentation when the design of the error management circuit 120 is updated (e.g., as a result of addition/removal of fault signals or other features), since such changes may be addressed by updating the internal registers 208, decoder 206 and encoder 210, without changing user registers 204. Some embodiments, advantageously avoid complex design parameterization for IPXACT generation by performing IPXACT generation on user registers and not on internal registers.

Figure 6:
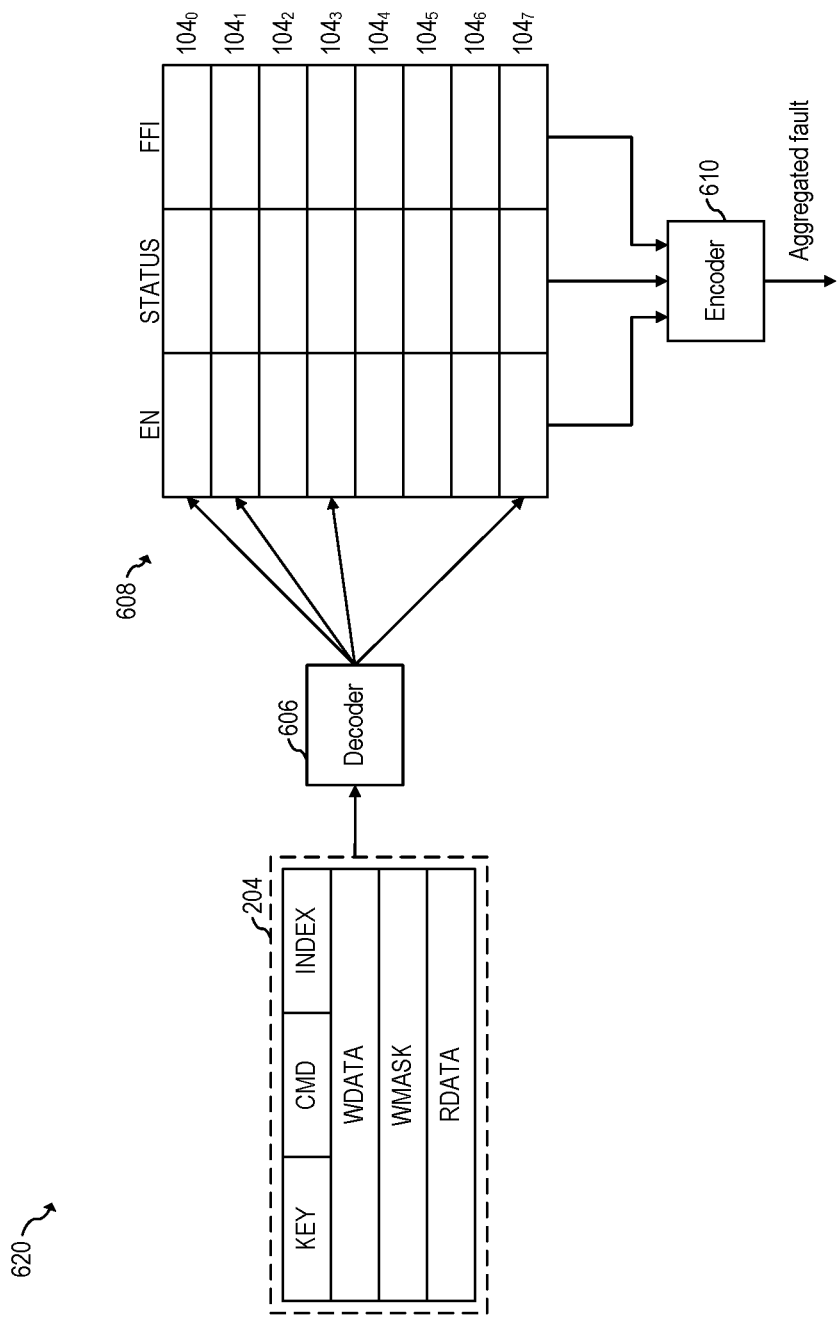
FIGS. 6-8 show block diagrams illustrating a configuration operation of internal registers via user registers, according to embodiments of the present invention.

FIG. 6 shows a block diagram illustrating a configuration operation of internal registers 608 via user registers 204, by error management circuit 620, according to an embodiment of the present invention. Error management circuit 120 may be implemented as error management circuit 620. Decoder 206 internal registers 208, and encoder 210 may be implemented as decoder 606, internal registers 608, and encoder 610, respectively.

In some embodiments, internal registers 608 include a plurality of registers associated with a respective safety monitor 104. In some embodiments, each of the internal register 608 includes an enable field (EN) including 1 bit indicative of whether to mask (e.g., when EN is 0) or not mask (e.g., when EN is 1) faults generated from the associated safety monitor 104. In some embodiments, each of the internal register 608 includes a status field (STATUS) including 1 bit indicative of whether a fault is being generated (e.g., when STATUS is 1) or not (e.g., when STATUS is 0) by the associated safety monitor 104. In some embodiments, each of the internal register 608 includes a fake fault injection field (FFI) including 1 bit for causing (e.g., when FFI is 1) or not causing (e.g., when FFI is 0) the injection of a fake fault in the associated safety monitor 104. In some embodiments, one or more (or all) registers of internal register 608 include additional/different fields. For example, in some embodiments, one or more registers of internal registers 608 (e.g., corresponding to critical functions) do not include an EN field (as they are always enabled). Other implementations are also possible.

FIG. 6 illustrates the performance of step 410, e.g., after performance of steps 402 and 404, e.g., according to method 400. For exemplary purposes, FIG. 6 assumes that 8 safety monitors 104 are associated with error management circuit 620, and assumes that the WDATA and WMASK fields are 8-bit fields, that an INDEX of 1 is associated with the group of 8 safety monitors 104 associated with error management circuit 620, and that encoder 610 generates a single aggregated fault.

As shown in FIG. 6, a single command CMD may cause a plurality of register writes of internal registers 608, which are controlled by decoder 606. For example, if processor 110 writes WMASK to 0x00, WDATA to 0x8B, CMD to 0x11 (group enable) and INDEX to 1, then decoder 606 programs to 1 the EN field for safety monitors $104_0$, $104_1$, $104_3$ and $104_7$. Thus encoder 610 may assert (e.g., to 1) the aggregated fault output if any of the safety monitors $104_0$, $104_1$, $104_3$ and $104_7$ generates a fault.

As another example, if processor 110 writes WMASK to 0x00, WDATA to 0x8B, CMD to 0x13 (for injecting a group of faults) and INDEX to 1, then decoder 606 programs to 1 the FFI field for safety monitors $104_0$, $104_1$, $104_3$ and $104_7$, which in turn causes safety monitors $104_0$, $104_1$, $104_3$ and $104_7$ to generate a fake fault, which may be captured in the STATUS bit of the respective safety monitors 104.

Figure 7:
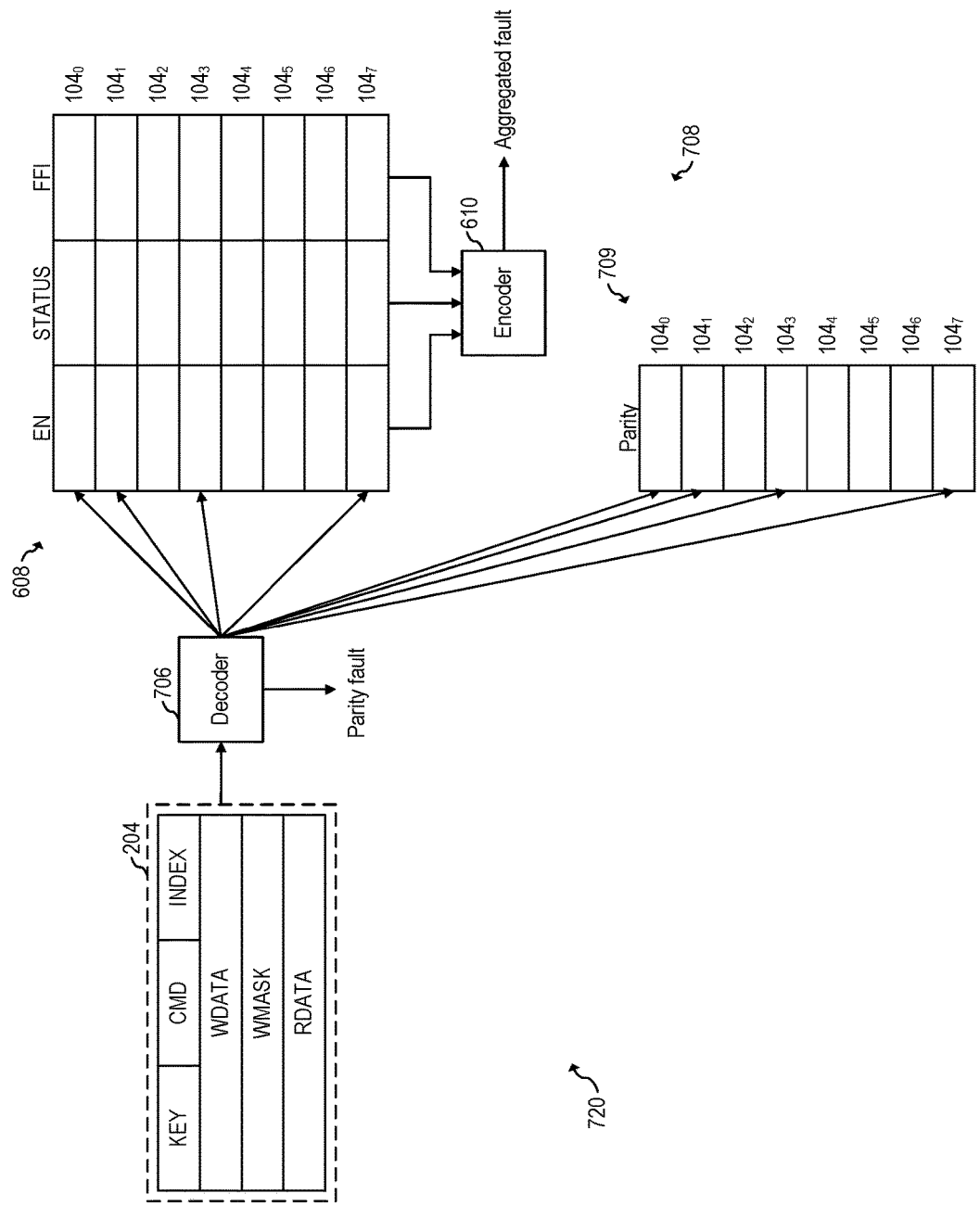

FIG. 7 shows a block diagram illustrating a configuration operation of internal registers 708 via user registers 204, by error management circuit 720, according to an embodiment of the present invention. Error management circuit 120 may be implemented as error management circuit 720. Decoder 206 and internal registers 208 may be implemented as decoder 706 and internal registers 708, respectively.

Error management circuit 720 operates in a similar manner as error management circuit 620. Error management circuit 720, however, includes internal registers 709 (in addition to internal registers 608. Internal registers 709 are used to add parity bits for error detection to the internal registers 608. For example, upon initial configuration of internal registers 608, decoder 706 generates golden parity bits (e.g., horizontal parity bits and/or vertical parity bits) associated with internal registers 608 and store the golden parity bits in internal registers 709. During normal operation, decoder 706 periodically recalculates the parity bits based on internal registers 608, and checks whether the recalculated parity bits match the golden parity bits stored in internal registers 709. If a mismatch occurs between the recalculated parity bits and the golden parity bits (e.g., suggesting that a bit flipped during normal operation), then decoder 706 issues a parity fault that may be routed to FCCU 102 (e.g., directly or via another error management circuit 120).

As illustrated in FIG. 7, advantageously, in some embodiments, parity bits may be added (e.g., to all) internal registers 608 for performing parity checks to detect bit flipping during normal operation without modifying user registers 204, e.g., by redesigning the decoder (e.g., from 608 to 708) and the internal registers (e.g., from 608 to 708) to accommodate for the new feature. Thus, some embodiments may add a feature, such as parity bits for error detection, to error management circuit 120 while advantageously (e.g., fully) reusing verification code, configuration code, circuit design documentation (e.g., datasheets, register maps) and IPXACT documentation associated with fault management of SoC 100.

In some embodiments, the addition of a feature to an error management circuit may cause only minimal changes to the user registers. For example, FIG. 8 shows a block diagram illustrating a configuration operation of internal registers 608 via user registers 802 by error management circuit 820, according to an embodiment of the present invention.

Figure 8:
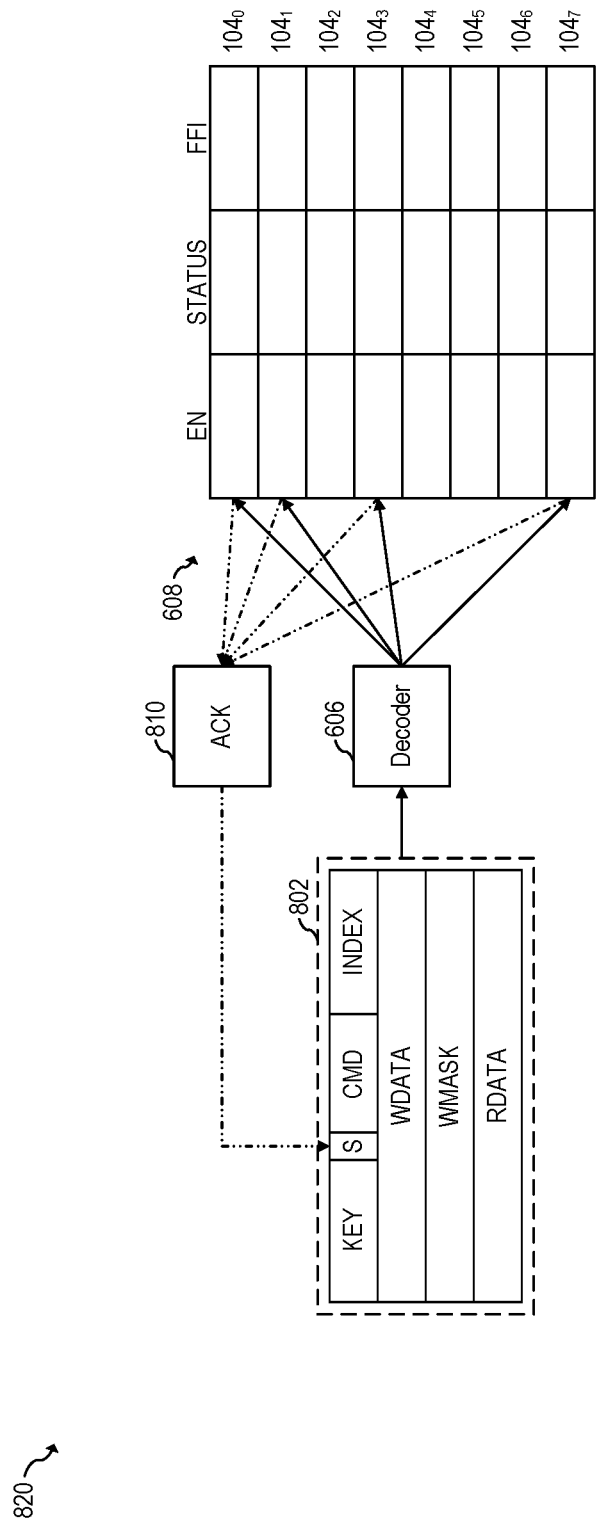

FIG. 8 illustrates the performance of step 410, e.g., after performance of steps 402 and 404, e.g., according to method 400. Error management circuit 120 may be implemented as error management circuit 820. User registers 204 may be implemented as user register 802.

Error management circuit 820 operates in a similar manner as error management circuit 620. Error management circuit 820, however, includes user registers 802 having a status bit (S) in the command register. For example, as shown in FIG. 8, a status bit (S) may be added to the command register (e.g., by using a bit of the CMD field) to acknowledge that the requested command has been performed. Such acknowledge may be provided by acknowledgement circuit 810, which may assert (e.g., to 1) the status bit S when all register writes to internal registers 608 are performed. In some embodiments, the status bit S is clean on read. The status bit S for acknowledging a write operation may be advantageous, e.g., in embodiments in which internal registers 602 and user register 802 are implemented in different clock domains.

In some embodiments, acknowledge circuit 810 may be implemented with any suitable clock domain crossing technique combined with a demultiplexer. Other implementations are possible.

Figure 9:
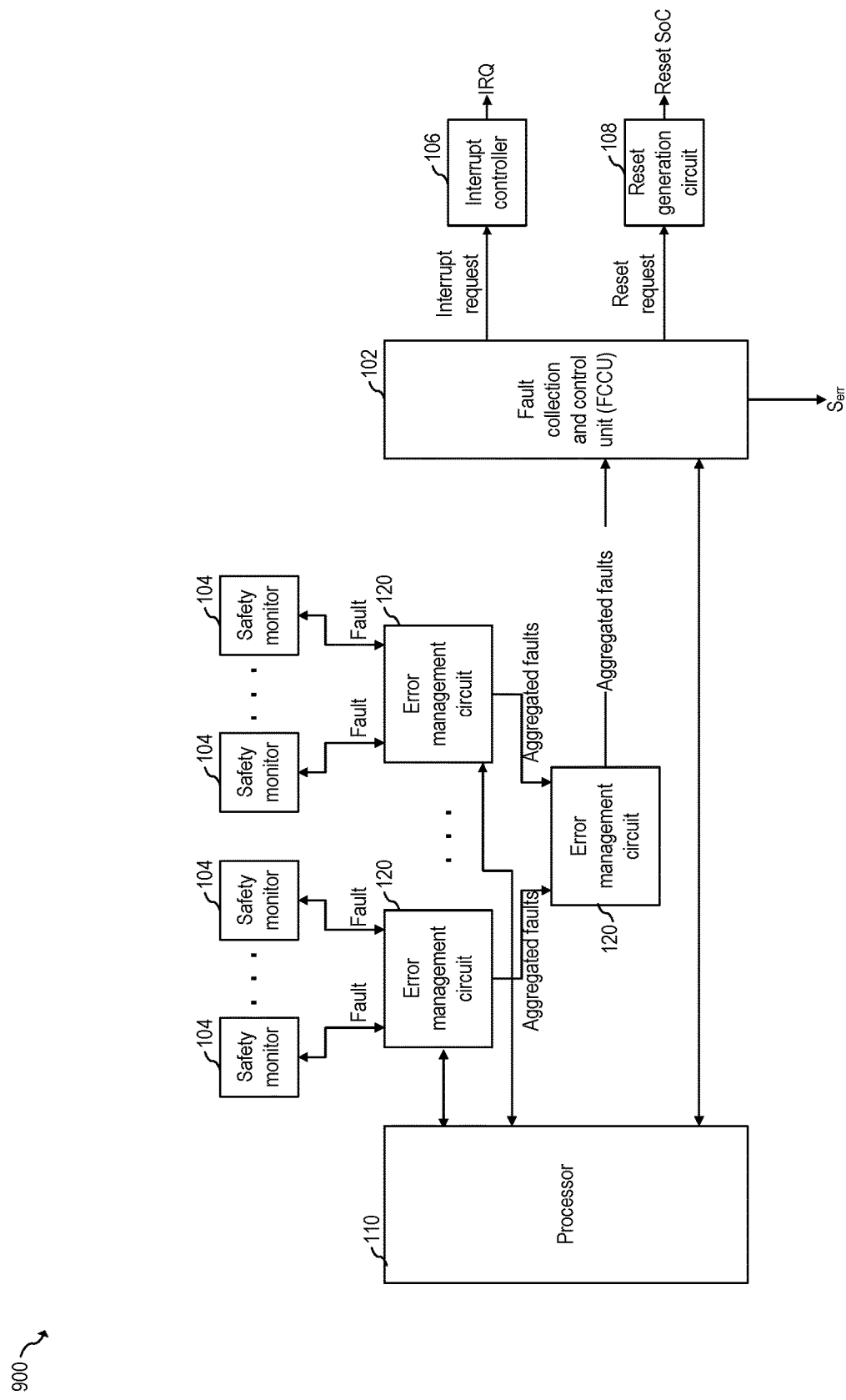
FIG. 9 shows a schematic diagram of an SoC, according to an embodiment of the present invention.

In some embodiments, the modular implementation of error management circuit 120 advantageously allows for a layered implementation of fault management from the safety monitors 104 to FCCU 102. For example, FIG. 9 shows a schematic diagram of SoC 900, according to an embodiment of the present invention. SoC 900 includes a plurality of layered error management circuits 120 and an FCCU 102.

SoC 900 operates in a similar manner as SoC 100. SoC 900, however, includes one or more layers of error management circuits 120. Although each error management circuit 120 of SoC 900 may be slightly different from each other (e.g., elements 206, 208, and 210 may be different from elements for each error management circuit 120, e.g., to accommodate for different number of fault signals and/or different number of aggregated fault signals, user registers 204 may be equal for each of the error management circuits 120.

In some embodiments, processor 110 may configure each error management circuit 120 via the respective user registers 204. In some embodiments, processor 110 may determine which safety monitor 104 generated a fault by identifying the source of the fault at each error management circuit layer. For example, processor 110 may access FCCU 102 to identify which error management circuit 120 (from the group of error management circuits 120 directly connected to FCCU 102) generated the fault, then access the identified error management circuit 120 to identify which of the error management circuits 120 coupled to it generated the fault, etc., until identify the particular safety monitor 104 generating the fault.

In some embodiments, implementing fault management in an SoC in a modular manner (e.g., using a plurality of error management circuits 120) advantageously allows for a distributed implementation in which error management circuits 120 are placed near their associated safety monitors, thereby advantageously reducing routing congestion and/or route length. For example, an error management circuit 120 dedicated for managing faults from safety monitors 104 associated with an MBIST may be placed near the MBIST circuit, while an error management circuit 120 dedicated for managing faults from safety monitors 104 associated with a logic BIST (LBIST) may be placed near the LBIST circuit.

In some embodiments, implementing the fault management in an SoC in a modular manner (e.g., using a plurality of error management circuits 120) advantageously allows for a simplified programming model and/or allows for a compact application code size and/or test code size, which may advantageously assist in generating optimized code. For example, in some embodiments, the number of internal registers associated with each error management circuit 120 may be smaller than the total number of internal registers if the FCCU 102 were to be implemented as a single module (without any error management circuit 120). Since each error management circuit 120 is relatively small (compared to an implementation with an FCCU 102 and no error management circuits 120), the associated code (e.g., for programming, testing) may be made compact. In some embodiments, the simplification of code may be possible as user registers are of the same type and number across different error management units, and considerably smaller in number compared to FCCU 102.

In some embodiments, implementing the fault management in an SoC in a modular manner (e.g., using a plurality of error management circuits 120) advantageously allows for parallel operation, which may advantageously result in faster fault processing times, as well as faster testing of the associated SoC. For example, in some embodiments, various error management circuits 120 may simultaneously perform actions (e.g., fake fault injection, enabling/disabling of safety monitors, processing and/or aggregation of faults, etc.), associated with their respective fault sources.

In some embodiments, implementing the fault management in an SoC in a modular manner (e.g., using a plurality of error management circuits 120) advantageously allows for easier reusability of the circuit design. For example, a particular module (e.g., a memory) may be designed with its associated testing circuits (e.g., MBIST) and associated error management circuits 120. Thus, a particular circuit may be reused without having to redesign the fault management portion associated with such particular circuit (since the associated error management circuit 120 may also be fully reused). In some embodiments, different versions of a circuit may include additional logic without considerably changing the core module.

Figure 10:
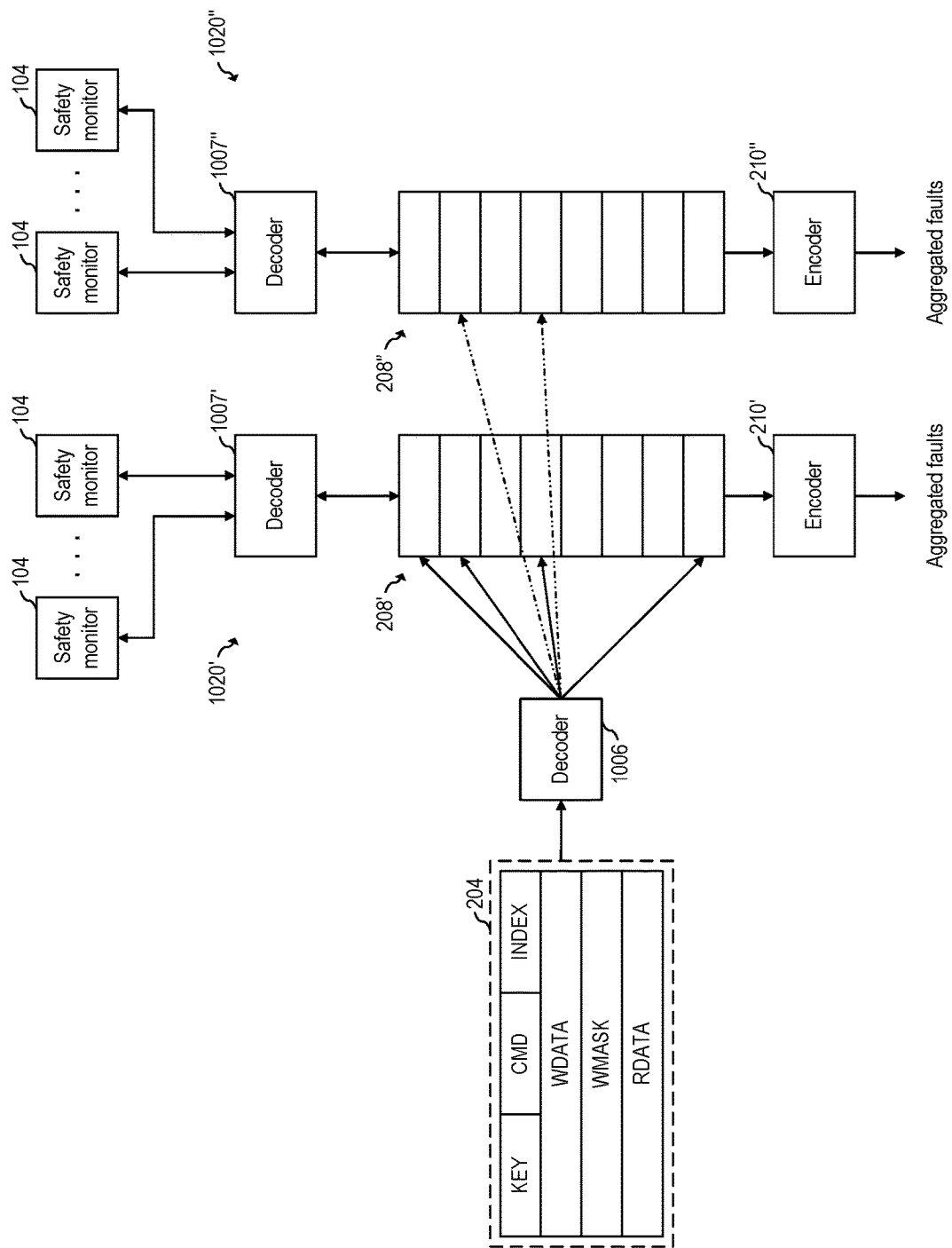
FIGS. 10 and 11 show block diagrams illustrating configuration operations of internal registers via user registers, according to embodiments of the present invention.

In some embodiments, the command registers may be a 32 bit register, where the INDEX field is a 10 bit field, the CMD field is a 6 bit field, and the KEY field is a 16 bit field. Other implementations are possible. Assuming for exemplary purposes that the INDEX field is a 10 bit field. Then, the INDEX field allows for the error management circuit 120 to manage 1024 fault sources. In some embodiments, one or more error management circuits 120 may manage less (or substantially less) than the maximum number of fault sources allowed by the number of bits of the INDEX field. Thus, in some embodiments, the same user registers and decoder may be shared to manage a plurality of error management circuits. For example, FIG. 10 shows a block diagram illustrating configuration operations of internal registers 208' and 208" of error management circuits 1020' and 1020", respectively, via a shared user registers 1004, according to an embodiment of the present invention. SoC 100 and 900 may be implement one or more error management circuits (e.g., 1020' and 1020") using a shared user registers 204 and shared decoder 1006.

FIG. 10 illustrates the performance of step 410, e.g., after performance of steps 402 and 404, e.g., according to method 400, in an SoC (e.g., 100 or 900).

As illustrated in FIG. 10, the same user registers 204 may be used to program internal registers 208' and 208". For example, in some embodiments, when the INDEX field is indicative of accessing internal register 208' (e.g., values between 0 and 511), decoder 1006 accesses (e.g., programs and/or reads) internal register 208'. When the INDEX field is indicative of accessing internal register 208" (e.g., values between 512 and 1023), decoder 1006 accesses (e.g., programs and/or reads) internal register 208".

As shown in FIG. 10, each error management circuit 1020 (e.g., 1020', 1020") may include a decoder (e.g., 1007', 1007") for routing fault signals from their associated safety monitors to the internal registers (e.g., 208', 208"), for processing the received faults, and/or for controlling their associated safety monitors 104 (e.g., for fake fault injection), and a respective encoder (e.g., 210', 210") for aggregating faults.

In some embodiments, decoders 1006, and 1007 (e.g., 1007', 1007") may be implemented with digital circuits, such as including combinatorial logic.

As illustrated in FIG. 10, in some embodiments, user registers 204 and decoder 1006 may be shared for accessing (e.g., writing/reading) internal registers (e.g., 208', 208") of a plurality of error management circuits (e.g., 1020', 1020"), which may advantageously result in a smaller circuit implementation.

Figure 11:
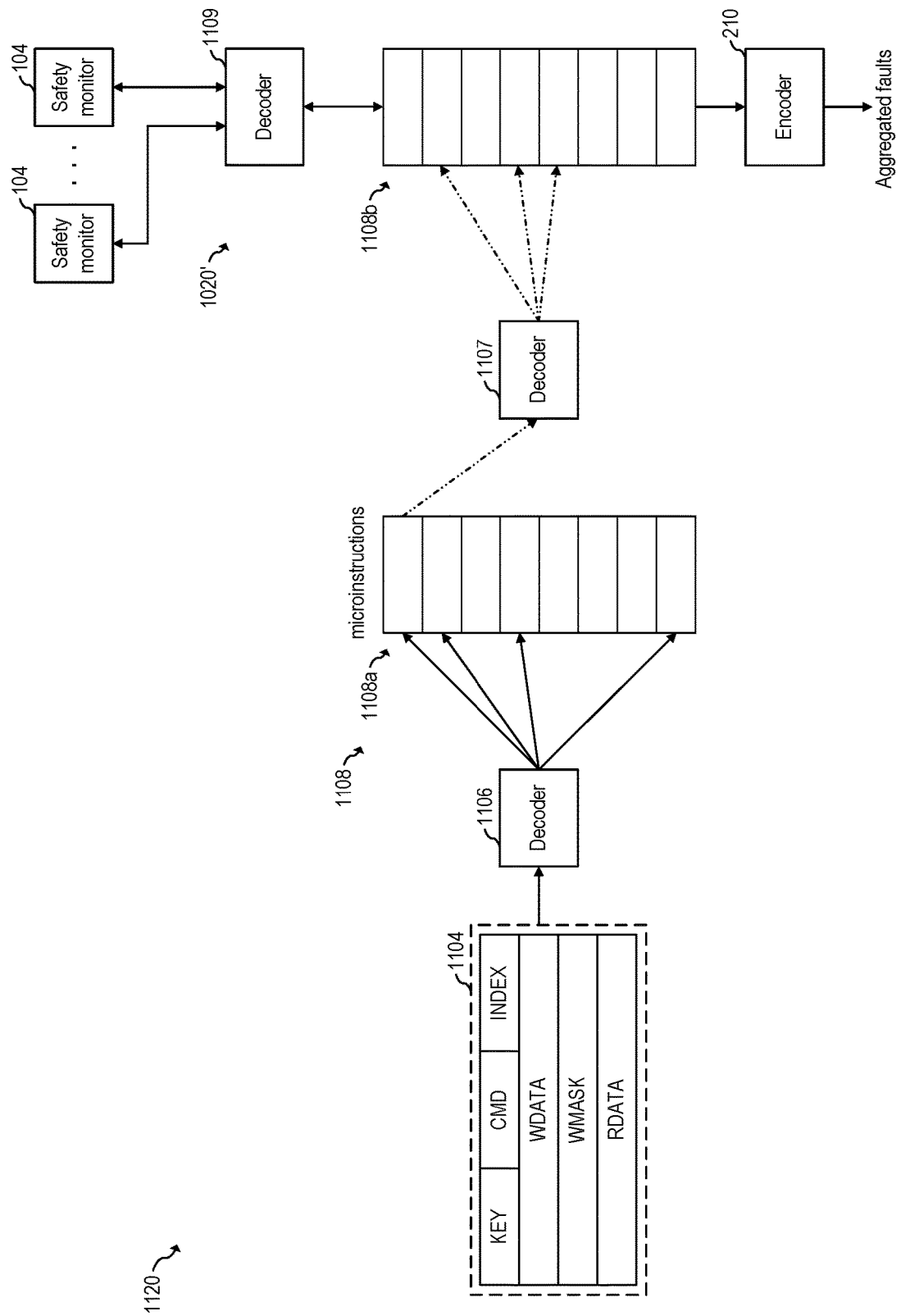

In some embodiments, multiple decoding levels may be implemented before accessing the internal registers of an error management circuit. For example, FIG. 11 shows a block diagram illustrating configuration operations of internal registers 1108 via user registers 1104 of error management circuit 1120, according to an embodiment of the present invention. Error management circuit 120 may be implemented as error management circuit 1120. User registers 204 may be implemented as user registers 1104. Decoder 206 may be implemented as the combination of decoders 1106, 1107 and 1109. Internal registers 208 may be implemented and internal registers 1108 (which include internal registers 1108*a* and 1108*b*).

FIG. 11 illustrates the performance of step 410, e.g., after performance of steps 402 and 404, e.g., according to method 400. Internal registers 1108 include internal registers 1108*a* and 1108*b*.

Error management circuit 1120 operates in a similar manner as error management circuit 620. Error management circuit 1120, however, includes a plurality of decoding levels before programing internal registers 1108*b*. For example, as shown in FIG. 11, internal registers 1108*a* are configured to store microinstructions, where each microinstruction involves the accessing (e.g., writing) of one or more internal registers 1108*b* for configuring one or more circuits of aspects of error management circuit 1120. For example, in some embodiments, decoder 1106 may execute one or more microinstructions (in internal registers 1108*a*) based on the content of the CMD, INDEX, WDATA, and WMASK fields. Decoder 1107 may program one or more internal registers 1108*b* based on the microinstruction executed. In some embodiments, the INDEX field of user registers 1104 of error management circuit 1120 may be modified to reflect the combination of level 1 (1108*a*) and level 2 (1108*b*) of internal registers 1108.

In some embodiments, multi-level decoding of user registers (e.g., as illustrated in FIG. 11) may advantageously allow for configuring complex error management circuits while keeping the configuration code compact.

Figure 12:
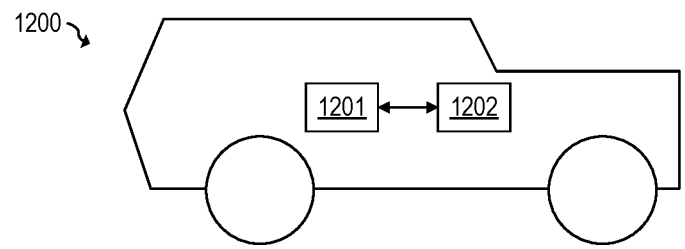
FIG. 12 illustrates a car, according to an embodiment of the present invention.

FIG. 12 illustrates car 1200, according to an embodiment of the present invention. Car 1200 includes SoC 1201 and central processing unit 1202. As shown, SoC 1201 may report errors (e.g., $S_{err}$) to central processing unit 1202, which may, in turn, take an action based on the received error signal, such as turn on a light in the dashboard, play a sound, etc.

In some embodiments, SoC 1201 may be implemented as SoC 100 or 900.

As shown in FIG. 12, a car may include SoC 1201. In some embodiments, other motor vehicles, such as a boat, an airplane, a motorcycle, etc., may include SoC 1201.

Figure 13:
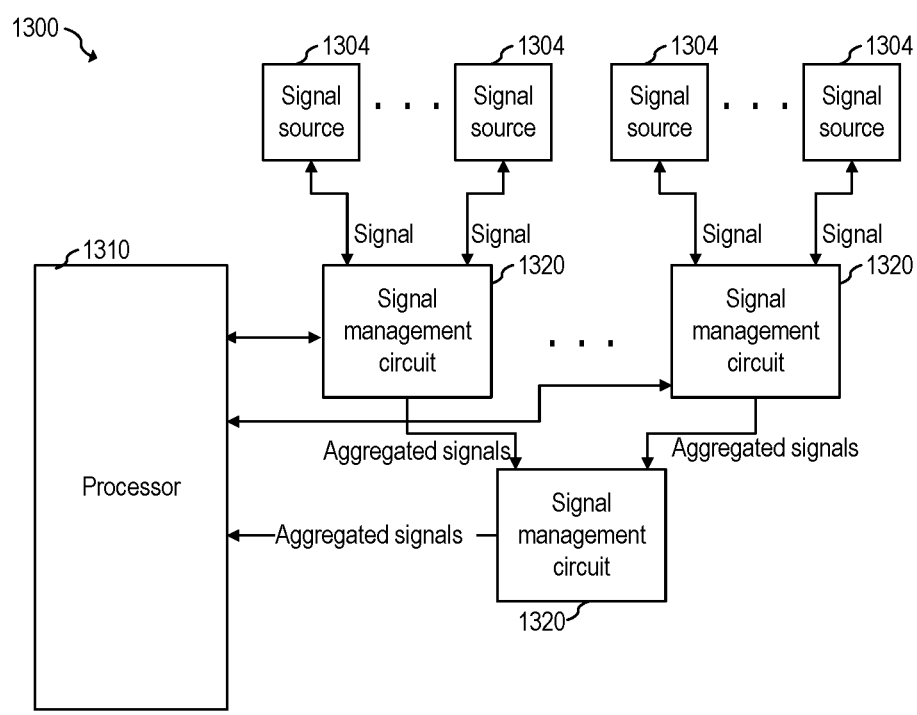
FIG. 13 shows a schematic diagram of an SoC, according to an embodiment of the present invention.

Although some embodiments have been illustrated with respect to the processing of fault signals, some embodiments, (e.g., as illustrated in FIGS. 1-12) may operate on signals different from fault signals, such as interrupts, DMA channels, wakeup lines, etc. For example, FIG. 13 shows a schematic diagram of SoC 1300, according to an embodiment of the present invention. SoC 1300 includes processor 1310, a plurality of signal sources 1304, and one or more signal management circuits 1320.

Signal sources 1304 may be, e.g., fault sources (e.g., such as 104), interrupt signal sources, wake-up signal sources, or other type of signal sources.

Signal management circuits 1320 receive the signals and aggregate such received signals to produce one or more aggregated signals that may be provided to another circuit (or to processor 1310).

In some embodiments, signal management circuit 1320 may be implemented in a similar or identical manner as fault management circuit 120.

As illustrated in FIG. 13, the benefits of modular and programmable signal management circuits having user registers decoupled from internal registers may be extended beyond fault signal management, such as including interrupt signal management, wake-up signal management, etc.

As illustrated in FIG. 13, similar to fault management circuits 120, signal management circuits 1320 may be implemented in a layered manner. Signal management circuits 1320 may also be implemented with shared user registers (e.g., as illustrated in FIG. 10).

Example embodiments of the present invention are summarized here. Other embodiments can also be understood from the entirety of the specification and the claims filed herein.

Example 1. An electronic circuit including: a plurality of signal channels; a signal collection circuit configured to determine an action of the electronic circuit based on channel signals from the plurality of signal channels; and a first signal management circuit coupled between the plurality of signal channels and the signal collection circuit, the first signal management circuit including: a set of internal registers, a set of user registers, and a decoder configured to program the set of internal registers based on a content of the set of user registers, where the first signal management circuit is configured to receive the channel signals via the plurality of signal channels, generate first aggregated signals based on the received channel signals and a content of the set of internal registers, and transmitting the first aggregated signals to the signal collection circuit.

Example 2. The electronic circuit of example 1, where the set of internal registers includes: a command register including a command field and an index field; and a write data register including a data write field, where the decoder is configured to program the set of internal registers based on the command, index, and data write fields.

Example 3. The electronic circuit of one of examples 1 or 2, where, in response to the command register being written, the decoder is configured to program a plurality of internal registers of the set of internal registers based on the command, index, and data write fields.

Example 4. The electronic circuit of one of examples 1 to 3, where the command register further includes a key field, where the decoder is configured to: check whether a content of the key field matches a predetermined value, and program the set of internal registers based on the command, index and data write fields only when the key field matches the predetermined value.

Example 5. The electronic circuit of one of examples 1 to 4, where the command register further includes a read data register including a read data field, where, in response to the command register being written with a command field indicative of a read command, the decoder is configured to cause the read data field to be populated with content of the set of internal registers based on the index field.

Example 6. The electronic circuit of one of examples 1 to 5, where the set of internal registers and the set of user registers operate in different clock domains, where the command register further includes a status bit, and where, in response to the command register being written, the decoder is configured to: program a plurality of internal registers of the set of internal registers based on the command, index, and data write fields; and cause the status bit to be asserted after the programming of the plurality of internal registers finishes.

Example 7. The electronic circuit of one of examples 1 to 6, where the set of internal registers includes a first portion configured to store a plurality of microinstructions, and a second portion, where the decoder includes: a first portion configured to program the first portion of the set of internal registers based on the command, index, and data write fields; and a second portion configured to program the second portion of the set of internal registers based on the first portion of the set of internal registers, where the first signal management circuit is configured to generate the first aggregated signals based on a content of the second portion of the set of internal registers.

Example 8. The electronic circuit of one of examples 1 to 7, further including: a second signal management circuit including a set of internal registers, a set of user registers, where the decoder of the first signal management circuit is configured to selectively program the set of internal registers of the first signal management circuit or the set of internal registers of the second signal management circuit based on a content of the set of user registers of the first signal management circuit.

Example 9. The electronic circuit of one of examples 1 to 8, where the set of internal registers of the first signal management circuit includes: a command register including a command field and an index field; and a write data register including a data write field, where the decoder of the first signal management circuit is configured to selectively program the set of internal registers of the first or second signal management circuits based on the index field.

Example 10. The electronic circuit of one of examples 1 to 9, further including a processor configured program a command register of the set of user registers of the first signal management circuit to cause the programing of a plurality of internal registers of the set of internal registers of the first signal management circuits based on content of a write data register of the set of user registers of the first signal management circuit.

Example 11. The electronic circuit of one of examples 1 to 10, further including a plurality of monitoring circuits coupled to respective signal channels of the plurality of signal channels, where the plurality of signal channels include fault signal channels originating from the plurality of monitoring circuits, and where the signal collection circuit includes a fault collection and control unit (FCCU).

Example 12. The electronic circuit of one of examples 1 to 11, where the decoder is configured to cause a fake fault injection in a first monitoring circuit of the plurality of monitoring circuits based on content of the set of internal registers of the first signal management circuit.

Example 13. The electronic circuit of one of examples 1 to 12, further including: an interrupt controller having an input configured to receive interrupt requests from the FCCU, the interrupt controller configured to interrupt the electronic circuit based on the interrupt request; and a reset generation circuit having an input configured to receive a reset request from the FCCU, the reset generation circuit configured to reset the electronic circuit based on the reset request.

Example 14. The electronic circuit of one of examples 1 to 13, where the plurality of monitoring circuits includes a plurality of temperature sensors and a plurality of built-in self-test (BIST) circuits.

Example 15. The electronic circuit of one of examples 1 to 14, where the plurality of BIST circuits includes a plurality of memory BIST (MBIST) circuits.

Example 16. The electronic circuit of one of examples 1 to 15, where the plurality of signal channels includes fault signal channels, interrupt signal channels, or wake-up signal channels.

Example 17. The electronic circuit of one of examples 1 to 16, where the electronic circuit is a microcontroller.

Example 18. The electronic circuit of one of examples 1 to 17, further including a second signal management circuit coupled between the first signal management circuit and the signal collection circuit, where the second signal management circuit is configured to receive the first aggregated signals from the first signal management circuit, generate second aggregated signals based on the first aggregated signals, and transmit the second aggregated signals to the signal collection circuit.

Example 19. An integrated circuit including: a first plurality of safety monitors coupled to respective fault channels of a first plurality of fault channels, where each safety monitor of the first plurality of safety monitors is configured to generate faults in the respective fault channels of the first plurality of fault channels; a fault collection and control unit (FCCU) configured to determine an action of the integrated circuit based on the faults generated by the first plurality of safety monitors; a first fault management circuit coupled between the first plurality of safety monitors and the FCCU, the first fault management circuit including: a set of internal registers, a set of user registers, and a decoder; and a processor configured to program the set of user registers, where the decoder is configured to program the set of internal registers in response to the processor programming the set of user registers, where the first fault management circuit is configured to receive faults from the first plurality of fault channels, generate first aggregated faults based on the received faults and on a content of the set of internal registers, and transmit the first aggregated faults to the FCCU.

Example 20. The integrated circuit of example 19, where the set of internal registers includes a command register including a command field and an index field, and a write data register including a data write field, where the processor is configured to program the command register after programming the write data register, and where the decoder is configured to, in response to the command register being written, program a plurality of internal registers of the set of internal registers based on the command, index, and data write fields.

Example 21. The integrated circuit of one of examples 19 or 20, where the FCCU is configured to generate an interrupt request or a reset request based on the first aggregated faults received from the first fault management circuit, the integrated circuit further including: an interrupt controller configured to receive interrupt requests from the FCCU, the interrupt controller configured to interrupt the integrated circuit based on the received interrupt requests; and a reset generation circuit configured to receive reset requests from the FCCU, the reset generation circuit configured to reset the integrated circuit based on the received reset requests.

Example 22. The integrated circuit of one of examples 19 to 21, further including: a second plurality of safety monitors; and a second fault management circuit coupled between the second plurality of safety monitors and the FCCU, where the second fault management circuit includes: a set of internal registers, a set of user registers, and a decoder, where the second fault management circuit is configured to receive faults from the second plurality of safety monitors, generate second aggregated faults based on the received faults from the second plurality of safety monitors and on a content of the set of internal registers of the second fault management circuit, and transmit the second aggregated faults to the FCCU, where the FCCU is configured to generate an interrupt request or a reset request based on the first and second aggregated faults.

Example 23. The integrated circuit of one of examples 19 to 22, where the integrated circuit is disposed inside a motor vehicle.

Example 24. A method including: writing to a write data register of a set of user registers of a fault management circuit that is coupled between a plurality of safety monitors and a fault collection and control unit (FCCU), the write data register including a data write field; after writing to the write data register, writing to a command register of the set of user registers, the command register including a command field and an index field; in response to the writing of the command register, writing a plurality of internal registers of a set of internal registers of the fault management circuit based on the command, index and data write fields; receiving faults generated by the plurality of safety monitors with the fault management circuit; generating aggregated faults based on the received faults and on the set of internal registers; transmitting the aggregated faults to the FCCU; and generating interrupt requests or reset requests using the FCCU based on the aggregated faults.

Example 25. The method of example 24, further including: periodically performing a parity check on the set of internal registers: generating a parity fault when the parity check fails; and transmitting the parity fault to the FCCU.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An electronic circuit comprising:
a plurality of signal channels;
a signal collection circuit configured to determine an action of the electronic circuit based on channel signals from the plurality of signal channels; and
a first signal management circuit coupled between the plurality of signal channels and the signal collection circuit, the first signal management circuit comprising:
a set of internal registers,
a set of user registers, and
a decoder configured to program the set of internal registers based on a content of the set of user registers, wherein the first signal management circuit is configured to receive the channel signals via the plurality of signal channels, generate first aggregated signals based on the received channel signals and a content of the set of internal registers, and transmit the first aggregated signals to the signal collection circuit.

2. The electronic circuit of claim 1, wherein the set of internal registers comprises:
a command register comprising a command field and an index field; and
a write data register comprising a data write field, wherein the decoder is configured to program the set of internal registers based on the command, index, and data write fields.

3. The electronic circuit of claim 2, wherein, in response to the command register being written, the decoder is configured to program a plurality of internal registers of the set of internal registers based on the command, index, and data write fields.

4. The electronic circuit of claim 3, wherein the command register further comprises a key field, wherein the decoder is configured to:
check whether a content of the key field matches a predetermined value, and
program the set of internal registers based on the command, index and data write fields only when the key field matches the predetermined value.

5. The electronic circuit of claim 2, wherein the command register further comprises a read data register comprising a read data field, wherein, in response to the command register being written with a command field indicative of a read command, the decoder is configured to cause the read data field to be populated with content of the set of internal registers based on the index field.

6. The electronic circuit of claim 2, wherein the set of internal registers and the set of user registers operate in different clock domains, wherein the command register further comprises a status bit, and wherein, in response to the command register being written, the decoder is configured to:
program a plurality of internal registers of the set of internal registers based on the command, index, and data write fields; and
cause the status bit to be asserted after the programming of the plurality of internal registers finishes.

7. The electronic circuit of claim 2, wherein the set of internal registers comprises a first portion configured to store a plurality of microinstructions, and a second portion, wherein the decoder comprises:
a first portion configured to program the first portion of the set of internal registers based on the command, index, and data write fields; and
a second portion configured to program the second portion of the set of internal registers based on the first portion of the set of internal registers, wherein the first signal management circuit is configured to generate the first aggregated signals based on a content of the second portion of the set of internal registers.

8. The electronic circuit of claim 1, further comprising: a second signal management circuit comprising a set of internal registers, a set of user registers, wherein the decoder of the first signal management circuit is configured to selectively program the set of internal registers of the first signal management circuit or the set of internal registers of the second signal management circuit based on a content of the set of user registers of the first signal management circuit.

9. The electronic circuit of claim 8, wherein the set of internal registers of the first signal management circuit comprises:
   a command register comprising a command field and an index field; and
   a write data register comprising a data write field, wherein the decoder of the first signal management circuit is configured to selectively program the set of internal registers of the first or second signal management circuits based on the index field.

10. The electronic circuit of claim 1, further comprising a processor configured program a command register of the set of user registers of the first signal management circuit to cause the programing of a plurality of internal registers of the set of internal registers of the first signal management circuits based on content of a write data register of the set of user registers of the first signal management circuit.

11. The electronic circuit of claim 1, further comprising a plurality of monitoring circuits coupled to respective signal channels of the plurality of signal channels, wherein the plurality of signal channels comprise fault signal channels originating from the plurality of monitoring circuits, and wherein the signal collection circuit comprises a fault collection and control unit (FCCU).

12. The electronic circuit of claim 11, wherein the decoder is configured to cause a fake fault injection in a first monitoring circuit of the plurality of monitoring circuits based on content of the set of internal registers of the first signal management circuit.

13. The electronic circuit of claim 11, further comprising:
   an interrupt controller having an input configured to receive interrupt requests from the FCCU, the interrupt controller configured to interrupt the electronic circuit based on the interrupt request; and
   a reset generation circuit having an input configured to receive a reset request from the FCCU, the reset generation circuit configured to reset the electronic circuit based on the reset request.

14. The electronic circuit of claim 11, wherein the plurality of monitoring circuits comprises a plurality of temperature sensors and a plurality of built-in self-test (BIST) circuits.

15. The electronic circuit of claim 14, wherein the plurality of BIST circuits comprises a plurality of memory BIST (MBIST) circuits.

16. The electronic circuit of claim 1, wherein the plurality of signal channels comprises fault signal channels, interrupt signal channels, or wake-up signal channels.

17. The electronic circuit of claim 1, wherein the electronic circuit is a microcontroller.

18. The electronic circuit of claim 1, further comprising a second signal management circuit coupled between the first signal management circuit and the signal collection circuit, wherein the second signal management circuit is configured to receive the first aggregated signals from the first signal management circuit, generate second aggregated signals based on the first aggregated signals, and transmit the second aggregated signals to the signal collection circuit.

19. An integrated circuit comprising:
   a first plurality of safety monitors coupled to respective fault channels of a first plurality of fault channels, wherein each safety monitor of the first plurality of safety monitors is configured to generate faults in the respective fault channels of the first plurality of fault channels;
   a fault collection and control unit (FCCU) configured to determine an action of the integrated circuit based on the faults generated by the first plurality of safety monitors;
   a first fault management circuit coupled between the first plurality of safety monitors and the FCCU, the first fault management circuit comprising:
      a set of internal registers,
      a set of user registers, and
      a decoder; and
   a processor configured to program the set of user registers, wherein the decoder is configured to program the set of internal registers in response to the processor programming the set of user registers, wherein the first fault management circuit is configured to receive faults from the first plurality of fault channels, generate first aggregated faults based on the received faults and on a content of the set of internal registers, and transmit the first aggregated faults to the FCCU.

20. The integrated circuit of claim 19, wherein the set of internal registers comprises a command register comprising a command field and an index field, and a write data register comprising a data write field, wherein the processor is configured to program the command register after programming the write data register, and wherein the decoder is configured to, in response to the command register being written, program a plurality of internal registers of the set of internal registers based on the command, index, and data write fields.

21. The integrated circuit of claim 19, wherein the FCCU is configured to generate an interrupt request or a reset request based on the first aggregated faults received from the first fault management circuit, the integrated circuit further comprising:
   an interrupt controller configured to receive interrupt requests from the FCCU, the interrupt controller configured to interrupt the integrated circuit based on the received interrupt requests; and
   a reset generation circuit configured to receive reset requests from the FCCU, the reset generation circuit configured to reset the integrated circuit based on the received reset requests.

22. The integrated circuit of claim 21, further comprising:
a second plurality of safety monitors; and
a second fault management circuit coupled between the second plurality of safety monitors and the FCCU, wherein the second fault management circuit comprises:
   a set of internal registers,
   a set of user registers, and
   a decoder, wherein the second fault management circuit is configured to receive faults from the second plurality of safety monitors, generate second aggregated faults based on the received faults from the second plurality of safety monitors and on a content of the set of internal registers of the second fault management circuit, and transmit the second aggregated faults to the FCCU, wherein the FCCU is configured to generate an interrupt request or a reset request based on the first and second aggregated faults.

23. The integrated circuit of claim 19, wherein the integrated circuit is disposed inside a motor vehicle.

24. A method comprising:
writing to a write data register of a set of user registers of a fault management circuit that is coupled between a plurality of safety monitors and a fault collection and control unit (FCCU), the write data register comprising a data write field;

after writing to the write data register, writing to a command register of the set of user registers, the command register comprising a command field and an index field;

in response to the writing of the command register, writing a plurality of internal registers of a set of internal registers of the fault management circuit based on the command, index and data write fields;

receiving faults generated by the plurality of safety monitors with the fault management circuit;

generating aggregated faults based on the received faults and on the set of internal registers;

transmitting the aggregated faults to the FCCU; and generating interrupt requests or reset requests using the FCCU based on the aggregated faults.

25. The method of claim 24, further comprising:

periodically performing a parity check on the set of internal registers:

generating a parity fault when the parity check fails; and transmitting the parity fault to the FCCU.

\* \* \* \* \*

UNITED STATES PATENT AND TRADEMARK OFFICE
CERTIFICATE OF CORRECTION

PATENT NO. : 11,698,833 B1
APPLICATION NO. : 17/567540
DATED : July 11, 2023
INVENTOR(S) : Pandey et al.

Page 1 of 1

It is certified that error appears in the above-identified patent and that said Letters Patent is hereby corrected as shown below:

In the Claims

In Column 23, in Claim 10, Line 13, delete "configured" and insert -- configured to --.

In Column 25, in Claim 25, Line 21, delete "registers:" and insert -- registers; --.

Signed and Sealed this
Tenth Day of October, 2023

Katherine Kelly Vidal
*Director of the United States Patent and Trademark Office*